United States Patent
Yasui et al.

(10) Patent No.: US 8,555,623 B2
(45) Date of Patent: Oct. 15, 2013

(54) EXHAUST PURIFICATION APPARATUS FOR INTERNAL COMBUSTION ENGINE

(75) Inventors: Yuji Yasui, Saitama (JP); Ikue Kawasumi, Saitama (JP); Michael Fischer, Offenbach/Am Main (DE)

(73) Assignee: Honda Motor Co., Ltd., Tokyo (JP)

( * ) Notice: Subject to any disclaimer, the term of this patent is extended or adjusted under 35 U.S.C. 154(b) by 431 days.

(21) Appl. No.: 12/936,706

(22) PCT Filed: Apr. 18, 2008

(86) PCT No.: PCT/JP2008/057628
§ 371 (c)(1),
(2), (4) Date: Oct. 7, 2010

(87) PCT Pub. No.: WO2009/128169
PCT Pub. Date: Oct. 22, 2009

(65) Prior Publication Data
US 2011/0041480 A1   Feb. 24, 2011

(51) Int. Cl.
*F01N 3/10* (2006.01)
(52) U.S. Cl.
USPC .............................. 60/301; 60/286
(58) Field of Classification Search
USPC .................................. 60/286, 301
See application file for complete search history.

(56) References Cited

U.S. PATENT DOCUMENTS

| 2004/0118109 | A1 | 6/2004 | Gladden |
| 2006/0042234 | A1 | 3/2006 | Song et al. |
| 2007/0122317 | A1* | 5/2007 | Driscoll et al. ............... 422/170 |
| 2008/0216463 | A1* | 9/2008 | Chaineux et al. ............... 60/274 |

FOREIGN PATENT DOCUMENTS

| DE | 42 14 183 A1 | 6/1993 |
| DE | 10 2006 027 357 A1 | 12/2007 |
| JP | 2003-529699 A | 10/2003 |
| JP | 2004-100700 A | 4/2004 |
| JP | 2004-251134 A | 9/2004 |
| JP | 2006-274986 A | 10/2006 |
| JP | 2007-051594 A | 3/2007 |
| JP | 2007-154849 A | 6/2007 |
| JP | 2008-506881 A | 3/2008 |
| WO | WO 00/29728 A1 | 5/2000 |
| WO | WO 2006/008625 A1 | 1/2006 |
| WO | WO 2006097268 A1 * | 9/2006 |

OTHER PUBLICATIONS

English translation of DE 102006027357 A1.*
JP Office Action issued to Application No. 2010-508080, mailed Aug. 7, 2012.

* cited by examiner

*Primary Examiner* — Thomas Denion
*Assistant Examiner* — Jason Shanske
(74) *Attorney, Agent, or Firm* — Arent Fox LLP

(57) ABSTRACT

An exhaust purification apparatus for internal combustion engine having a selective reduction catalyst that while maintaining a high NOx reduction ratio, inhibits any ammonia discharge downstream of the selective reduction catalyst. In the exhaust purification apparatus (2), a urea selective reduction catalyst (23) comprises a first selective reduction catalyst (231) and, provided downstream of the first selective reduction catalyst (231) in an exhaust passageway (11), a second selective reduction catalyst (232). Further, the exhaust purification apparatus (2) includes a urea injection unit (25) for feeding of a reducing agent upstream of the urea selective reduction catalyst (23) in the exhaust passageway (11) and an ammonia sensor (26) for detection of the ammonia concentration at a site between the first selective reduction catalyst (231) and the second selective reduction catalyst (232) in the exhaust passageway (11). The rate of urea injection, $G_{UREA}$, by the urea injection unit (25) is determined so that the value of ammonia concentration, $NH3_{CONS}$, detected by the ammonia sensor (26) is greater than "0."

12 Claims, 27 Drawing Sheets

FIG. 2
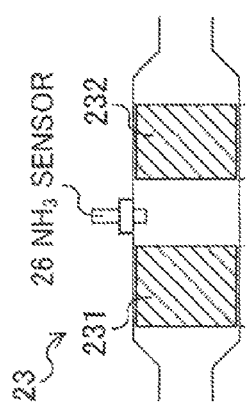
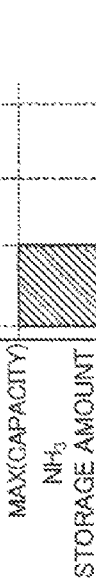
(a) 1BED+NOx SENSOR LAYOUT    (b) 1BED+NH3 SENSOR LAYOUT    (c) 2BED+MID-NH3 SENSOR LAYOUT REFERENCE NOx
REDUCTION RATE MAP

REDUCTION RATE CORRECTION FACTOR MAP

EXHAUST PURIFICATION APPARATUS FOR INTERNAL COMBUSTION ENGINE

CROSS-REFERENCE TO RELATED APPLICATION

This is a National Stage entry of International Application No. PCT/JP2008/057628, filed Apr. 18, 2008, the contents of the prior application are hereby incorporated herein in their entirety by reference.

TECHNICAL FIELD

The present invention relates to an exhaust purification apparatus for an internal combustion engine, and particularly relates to an exhaust purification apparatus for an internal combustion engine that is provided with a selective reduction catalyst that reduces NOx in the exhaust under the presence of a reducing agent.

BACKGROUND ART

Conventionally, as one of the exhaust purification apparatuses that purify NOx in exhaust, an apparatus has been proposed in which a selective reduction catalyst is provided in an exhaust channel that selectively reduces NOx in the exhaust by adding a reducing agent. For example, with the selective reduction catalyst of a urea addition type using urea water as the reducing agent, ammonia is generated from the urea thus added, and NOx in the exhaust is selectively reduced by this ammonia.

With such a selective reduction catalyst, in a case of the injection amount of the reducing agent being less than an optimum amount, the NOx reduction rate declines from the ammonia being consumed in the reduction of NOx being insufficient, and in a case of being larger than this optimum amount, the ammonia that has become surplus in the reduction of NOx is discharged. As a result, appropriately controlling the injection amount of reducing agent has been important in exhaust purification apparatuses provided with a selective reduction catalyst. Therefore, in Patent Document 1 and Patent Document 2, apparatuses are exemplified that estimate a NOx reduction rate of a selective reduction catalyst, and control an injection amount of the reducing agent based on this estimation.

With the exhaust purification apparatus of Patent Document 1, the NOx concentration on a downstream side of the selective reduction catalyst is detected, and the composition of the exhaust flowing into the selective reduction catalyst, more specifically, the ratio of NO and $NO_2$, is estimated from the NOx concentration thus detected and the operating state of the internal combustion engine. Furthermore, based on this composition of the exhaust, the NOx reduction rate of the selective reduction catalyst is estimated and the injection amount of reducing agent is controlled.

In addition, with the exhaust purification apparatus of Patent Document 2, the temperature of the catalyst is detected as an amount relating to the NOx reduction rate of the selective reduction catalyst, and the injection amount of reducing agent is controlled based on this temperature.

However, the NOx reduction rate of the selective reduction catalyst changes not only by the above such composition of the exhaust and temperature of the selective reduction catalyst, but also according to the degradation state of the selective reduction catalyst. In addition, there is variability in purification performance between individual units. In addition to this, in a case of ammonia having been stored in the selective reduction catalyst, the NOx reduction rate of the selective reduction catalyst changes upon appearance due to the optimum amount of reducing agent differing. Therefore, it is difficult to always optimally control the injection amount of reducing agent with exhaust purification apparatuses such as those exemplified in Patent Documents 1 and 2.

Consequently, a technique is considered below that more directly detects the NOx reduction rate of the selective reduction catalyst, and controls the injection amount of reducing agent based on this.

FIG. 29 is a schematic diagram showing a configuration of a conventional exhaust purification apparatus 80.

As shown in FIG. 29, an oxidation catalyst 83, urea injection valve 85 that injects urea water as a reducing agent that is stored in a urea tank 84 into an exhaust channel 82, and a selective reduction catalyst 86 that reduces NOx in the exhaust under the presence of urea water are provided in sequence from an upstream side to a downstream side in the exhaust channel 82 of an engine 81. In addition, a temperature sensor 87 that detects a temperature of the selective reduction catalyst 86 and a NOx sensor 88 that detects a NOx concentration on a downstream side of the selective reduction catalyst 86 are provided as sensors for observing the purification performance of the selective reduction catalyst.

With this exhaust purification apparatus 80, for example, the NOx concentration of exhaust discharged from the engine 81 is estimated by way of a map set in advance, and the injection amount of urea water by way of the urea injection valve 85 is determined based on this NOx concentration and the catalyst temperature detected by the temperature sensor 87. In particular, herein, degradation of the selective reduction catalyst 86 can be estimated based on a difference between the NOx concentration detected by the NOx sensor 88 and the NOx concentration of exhaust thus estimated. With this exhaust purification apparatus, it has been possible to correct the injection amount of urea water in accordance with the degradation state of the selective reduction catalyst 86 estimated in the above way.

Patent Document 1: Japanese Unexamined Patent Application Publication No. 2006-274986

Patent Document 2: Japanese Unexamined Patent Application Publication No. 2004-100700

DISCLOSURE OF THE INVENTION

Problems to be Solved by the Invention

FIG. 30 shows relationships between a NOx concentration and ammonia concentration in exhaust downstream of the selective reduction catalyst and the output value of the NOx sensor for the aforementioned conventional exhaust purification apparatus. More specifically, FIG. 30 shows, in sequence from the upper graph, relationships between the NOx concentration of exhaust downstream of the selective reduction catalyst, the ammonia concentration of exhaust downstream of the selective reduction catalyst, and the output value of the NOx sensor, with the urea injection amount.

When the injection amount of urea water increases, the NOx reduction rate of the selective reduction catalyst rises due to the ammonia generated in the selective reduction catalyst also increasing. As a result, the NOx concentration downstream of the selective reduction catalyst decreases accompanying the injection amount of urea water increasing, as shown in FIG. 30. In addition, when exceeding the urea water injection amount shown by the star, the NOx concentration is substantially constant irrespective of the urea water injection amount. In other words, the urea water of an amount exceeding the star indicates being surplus relative to reducing the NOx generated.

In addition, herein, the ammonia generated from the urea water that is surplus is not consumed in the reduction of NOx, and is, either stored in the selective reduction catalyst or discharged to downstream of the selective reduction catalyst. Therefore, as shown in FIG. 30, the ammonia concentration of exhaust downstream of the selective reduction catalyst increases, when exceeding the injection amount of urea water indicated by the star. It should be noted that the ammonia generated in this way is stored in the selective reduction catalyst, and the discharging to downstream thereof is referred to hereinafter as "ammonia slip".

Since the urea water injection amount indicated by the star in FIG. 30 can both minimize the NOx concentration and ammonia concentration in the above way, it is the optimum injection amount for this exhaust purification apparatus.

However, as shown in FIG. 30, the output value of the NOx sensor shows a downward convex characteristic in which the output value of this optimum injection amount is a minimum point. This is because existing NOx sensors in the detection principles thereof are sensitive not only to NOx, but also to ammonia.

Therefore, it is impossible to determine whether the injection amount of urea water is insufficient relative to the optimum injection amount or excessive, with only the output value from the NOx sensor. As a result, it is difficult to constantly supply urea water of an optimum amount and maintain the NOx reduction rate of the selective reduction catalyst to be high, while suppressing the discharge of ammonia.

The present invention was made taking into account of the aforementioned points, and has an object of providing an exhaust purification apparatus of an internal combustion engine provided with a selective reduction catalyst that can suppress discharging of ammonia to downstream of the selective reduction catalyst, while maintaining a high NOx reduction rate.

Means for Solving the Problems

In order to achieve the above-mentioned object, according to an invention of a first aspect, in an exhaust purification apparatus (2) for an internal combustion engine that includes a selective reduction catalyst (23) that is provided in an exhaust channel (11) of an internal combustion engine (1), generates ammonia under the presence of a reducing agent, and reduces NOx flowing through the exhaust channel by way of this ammonia, in which the selective reduction catalyst is configured to include a first selective reduction catalyst (231), and a second selective reduction catalyst (232) that is provided in the exhaust channel further to a downstream side than the first selective reduction catalyst, the apparatus includes: a reducing agent supply means (25) for supplying reducing agent into the exhaust channel to an upstream side of the selective reduction catalyst; an ammonia concentration detection means (26) for detecting an ammonia concentration in the exhaust channel between the first selective reduction catalyst and the second selective reduction catalyst; a first control input calculation means (3, 4, 42) for calculating a control input for controlling so that a value of the ammonia concentration ($NH3_{CONS}$) detected by way of the ammonia concentration detection means becomes a value greater than "0"; and a reducing agent supply amount determination means (3, 7) for determining a supply amount ($G_{UREA}$) of the reducing agent from the reducing agent supply means to include the control input ($G_{UREA\_FB}$) calculated by the first control input calculation means.

According to an invention of a second aspect, in the exhaust purification apparatus for an internal combustion engine as described in the first aspect, an ammonia amount that can be stored in the first selective reduction catalyst is set as a first storage capacity, an ammonia amount that can be stored in the second selective reduction catalyst is set as a second storage capacity, and the second storage capacity is larger than a difference between a maximum and minimum of the first storage capacity.

According to an invention of a third aspect, the exhaust purification apparatus for an internal combustion engine as described in the first or second aspect further includes: a target ammonia concentration setting means (3, 41) for setting a value of a target concentration of the ammonia concentration ($NH3_{CONS}$) detected by way of the ammonia concentration detection means to a value larger than "0", in which the first control input calculation means calculates the control input so that the ammonia concentration ($NH3_{CONS}$) detected by the ammonia concentration detection means falls within a predetermined range ($RNH3_{CONS\_TRGT}$, $NH3_{CONS\_LMTL}$ to $NH3_{CONS\_LMTH}$) containing the target concentration ($NH3_{CONS\_TRGT}$).

According to an invention of a fourth aspect, in the exhaust purification apparatus for an internal combustion engine as described in the third aspect, the first control input calculation means is configured to be able to execute response specific control that can set a convergence rate to the target concentration of the ammonia concentration ($NH3_{CONS}$) detected by way of the ammonia concentration detection means, and sets a convergence rate in a case of the ammonia concentration detected by way of the ammonia concentration detection means being contained within the predetermined range ($RNH3_{CONS\_TRGT}$, $NH3_{CONS\_LMTL}$ to $NH3_{CONS\_LMTH}$) to be slower than a convergence rate in a case of the ammonia concentration detected by way of the ammonia concentration detection means being contained outside of the predetermined range ($RNH3_{CONS\_TRGT}$, $NH3_{CONS\_LMTL}$ to $NH3_{CONS\_LMTH}$).

According to an invention of a fifth aspect, in the exhaust purification apparatus for an internal combustion engine as described in the third or fourth aspect, an ammonia amount stored in the second selective reduction catalyst is set as a second storage amount, and the target ammonia concentration setting means estimates the second storage amount and sets the target concentration based on the second storage amount ($NH3_{2BED\_ST}$) thus estimated.

According to an invention of a sixth aspect, the exhaust purification apparatus for an internal combustion engine as described in any one of the third to fifth aspects further includes: a second control input calculation means (5) for calculating a control input based on a revolution speed (NE) of the internal combustion engine and a load parameter (TRQ) representing a load of the internal combustion engine, in which the reducing agent supply amount determination means determines a supply amount ($G_{UREA}$) of reducing agent from the reducing agent supply means to further include the control input ($G_{UREA\_FF}$) calculated by the second control input calculation means.

According to an invention of a seventh aspect, in the exhaust purification apparatus for an internal combustion engine as described in any one of the third to sixth aspects, an ammonia amount stored in the first selective reduction catalyst is set as a first storage amount, the apparatus further includes a third control input calculation means (6) for estimating the first storage amount, and calculating a control input ($G_{UREA\_ST}$) for controlling so that the first storage amount ($ST_{UREA\_FB}$) thus estimated converges with a predetermined target storage amount ($ST_{UREA\_TRGT}$), in which the reducing agent supply amount determination means determines a supply amount ($G_{UREA}$) of reducing agent from the reducing agent supply means to further include the control input calculated ($G_{UREA\_ST}$) by way of the third control input calculation means.

According to an eighth aspect of the invention, in the exhaust purification apparatus for an internal combustion engine as described in the seventh aspect, the third control input calculation means calculates a control input ($G_{UREA\_ST}$) based on a deviation ($E_{ST}$) between the first storage amount ($ST_{UREA\_FB}$) estimated and the target storage amount ($ST_{UREA\_TRGT}$) as well as on a derivative of the deviation or a derivative of the first storage amount.

Effects of the Invention

According to the invention as described in the first aspect, a first selective reduction catalyst and a second selective reduction catalyst are provided in sequence towards a downstream side in the exhaust channel, and further, a reducing agent supply means for supplying reducing agent from an upstream side of the first selective reduction catalyst and the second selective reduction catalyst, and an ammonia concentration detection means for detecting an ammonia concentration between the first selective reduction catalyst and the second selective reduction catalyst are provided. Then, a control input is calculated for controlling so that the ammonia concentration detected by way of the ammonia concentration detection means becomes a value greater than "0", and the supply amount of reducing agent from the reducing agent supply means is determined to be include such a control input.

With this, a state in which ammonia flows out from the first selective reduction catalyst, i.e. a state in which ammonia is sufficiently stored in the first selective reduction catalyst, is held, and thus it is possible to maintain a high NOx reduction rate. In particular, the NOx reduction rate during transition until the generation of ammonia ends can be maintained to be high due to ammonia stored in the first selective reduction catalyst, even if in a case in which NOx of a great amount is temporarily generated by sudden change in the operating state of the internal combustion engine such that the generation of ammonia for reducing this NOx cannot keep pace.

In addition, in this case, although ammonia slip occurs in the first selective reduction catalyst, the ammonia discharged is either stored in the second selective reduction catalyst or consumed in the reduction of NOx in the second selective reduction catalyst. With this, it is possible to maintain a high NOx reduction rate, as well as suppressing ammonia from being discharged to furthest downstream of the selective catalyst.

Incidentally, the storage capacity of the selective reduction catalyst changes according to the temperature of this selective reduction catalyst. More specifically, the storage capacity becomes smaller with the temperature of the selective reduction catalyst rising. Therefore, in a state in which ammonia is sufficiently stored in the first selective reduction catalyst as described above, if the temperature thereof suddenly rises, the first storage capacity will suddenly decreases, and the ammonia that had been stored will be discharged to the second selective reduction catalyst.

According to the invention as described in the second aspect, the second storage capacity of the second selective reduction catalyst is set to be larger than a difference between a maximum and minimum of the first storage capacity of the first selective reduction catalyst. With this, even in a case of the temperature of the first selective reduction catalyst suddenly rising by the operating state of the internal combustion engine transitioning from a low load operating state to a high load operating state, and ammonia being discharged from the first selective reduction catalyst to a downstream side thereof, this ammonia can be stored by the second selective reduction catalyst. With this, ammonia can be further suppressed from discharging to the furthest downstream of the selective reduction catalyst.

Incidentally, the NOx reduction rate of the selective reduction catalyst has a smaller response lag and higher sensitivity than the ammonia slip of this selective reduction catalyst to the supply amount of the reducing agent. In other words, if the supply amount of reducing agent decreases in order to suppress ammonia slip, for example, there is a problem in that the NOx reduction rate of the selective reduction catalyst declines drastically.

According to the invention as described in the third aspect, the value of the target concentration for the ammonia concentration detected by the ammonia concentration detection means is set to a value greater than "0", and the control input is calculated so that the ammonia concentration thus detected falls within a predetermined range including this target concentration, and the supply amount of the reducing agent is calculated by including this control input.

In other words, by controlling the supply amount of reducing agent so that the ammonia concentration between the first selective reduction catalyst and the second selective reduction catalyst falls within a predetermined range including the target concentration, the fluctuation in the supply amount of reducing agent can be made small. With this, it is possible to maintain the NOx reduction rate of the NOx reduction catalyst to be high. The above such control in which the occurrence of ammonia slip of the first selective reduction catalyst is made a prerequisite is particularly effective in the present invention, which is characterized by providing the second selective reduction catalyst on a downstream side of the first selective reduction catalyst.

According to the invention as described in the fourth aspect, the control input for controlling so that the ammonia concentration detected by the ammonia concentration detection means falls within a predetermined range including the target concentration is calculated by response specific control that can specify the convergence rate to the target concentration. In addition, herein, the convergence rate in a case of the ammonia concentration thus detected being included within the above-mentioned range is set so as to be slower than the convergence rate in a case of being included outside of the above-mentioned range.

With this, in a case in which the ammonia concentration detected is included outside the above-mentioned range, the occurrence of excessive ammonia slip and a decline in NOx reduction rate are quickly suppressed, and in a case in which the ammonia concentration detected is included within the above-mentioned range, a great change in the supply amount of reducing agent is prevented, and thus the NOx reduction rate can be prevented from drastically declining.

According to the invention as described in the fifth aspect, the second storage amount of the second selective reduction catalyst is estimated, and the target concentration of the ammonia concentration detected by the ammonia concentration detection means is set based on this second storage amount estimated.

With this, in a case in which the storage amount of ammonia in the second selective reduction catalyst has become temporarily excessive, this storage amount can be reduced by setting the target concentration to a small value, for example.

Therefore, a storage amount of ammonia that can be stored in the second selective reduction catalyst can be ensured in preparation for a case in which ammonia of a great amount is discharged from the first selective reduction catalyst, accompanying a sudden change in the operating state of the internal combustion engine as described above. Therefore, ammonia can be further suppressed from discharging to the furthest downstream of the selective reduction catalyst.

According to the invention as described in the sixth aspect, a control input is calculated based on the revolution speed of the internal combustion engine and a load parameter that represents the load of the internal combustion engine, and the supply of amount of reducing agent is set to further include this control input. Since the NOx concentration in the exhaust changes depending to the operating state such as the revolution speed and load of the internal combustion engine, reducing agent of an appropriate amount according to the NOx concentration of exhaust flowing into the selective reduction catalyst can be supplied by determining the supply amount of reducing agent to include such a control input. With this, it is possible to maintain the NOx reduction rate of the selective reduction catalyst to be high.

In addition, at the same time, by maintaining the NOx reduction rate to be high in this way, it is possible to prevent large fluctuation in the supply amount of reducing agent, as well as to protect against the occurrence of ammonia slip and a decline in the NOx reduction rate accompanying such a fluctuation.

Incidentally, in a case of having started the supply of reducing agent from a state in which the first storage amount of the first selective reduction catalyst is less than the first storage capacity, the NOx reduction rate declines until the first storage amount reaches the first storage capacity, i.e. until ammonia in the first selective reduction catalyst saturates. In addition, after ammonia has saturated, ammonia slip occurs in the first selective reduction catalyst. Herein, in a case of ammonia slip having occurred, the supply amount of reducing agent in order suppress this is decreased, whereby the NOx reduction rate may decline again.

According to the invention as described in the seventh aspect, the first storage amount of the first selective reduction catalyst is estimated, a control input for controlling so that this first storage amount estimated converges with a predetermined target storage amount is calculated, and the supply amount of reducing agent is determined to further include such a control input.

With this, in a case of the first storage amount being less than the first storage capacity, the time until reaching the first storage capacity can be shortened and the NOx reduction rate quickly raised, by increasing the supply amount of reducing agent, for example.

In addition, immediate prior to the first storage amount reaching the first storage capacity, for example, the occurrence of ammonia slip in the first selective reduction catalyst can be prevented by reducing the supply amount of reducing agent. With this, when ammonia slip has occurred as described above, it is possible to also prevent a decline in the NOx reduction rate from occurring in a case of the supply amount of reducing agent decreasing with the aim of suppressing this.

According to the invention as described in the eighth aspect, when calculating the control input for controlling so that the first storage amount estimated converges with the predetermined target storage amount, the control input is calculated based on a derivative between the first storage amount estimated and the target storage amount as well as on a derivative of the deviation or a derivative of the first storage amount.

Herein in particular, the first storage amount is calculated by performing step-by-step integration of the ammonia amount stored in the first selective reduction catalyst, and the dynamic characteristic thereof indicates integral element-like behavior. If the control input is calculated only from the deviation between such a first storage amount and predetermined target storage amount, this control input will oscillate, and periodic ammonia slip may occur as a result. According to this invention, the control input is calculated based on the deviation between the first storage amount and the target storage amount as well as the derivative of this deviation or derivative of the first storage amount, whereby oscillatory behavior of the control input can be prevented.

BRIEF DESCRIPTION OF THE DRAWINGS

FIG. 2 is a view showing relationships between the NOx concentration, ammonia concentration, and storage amount of ammonia of a selective reduction catalyst according to the embodiment;

Figure 1:
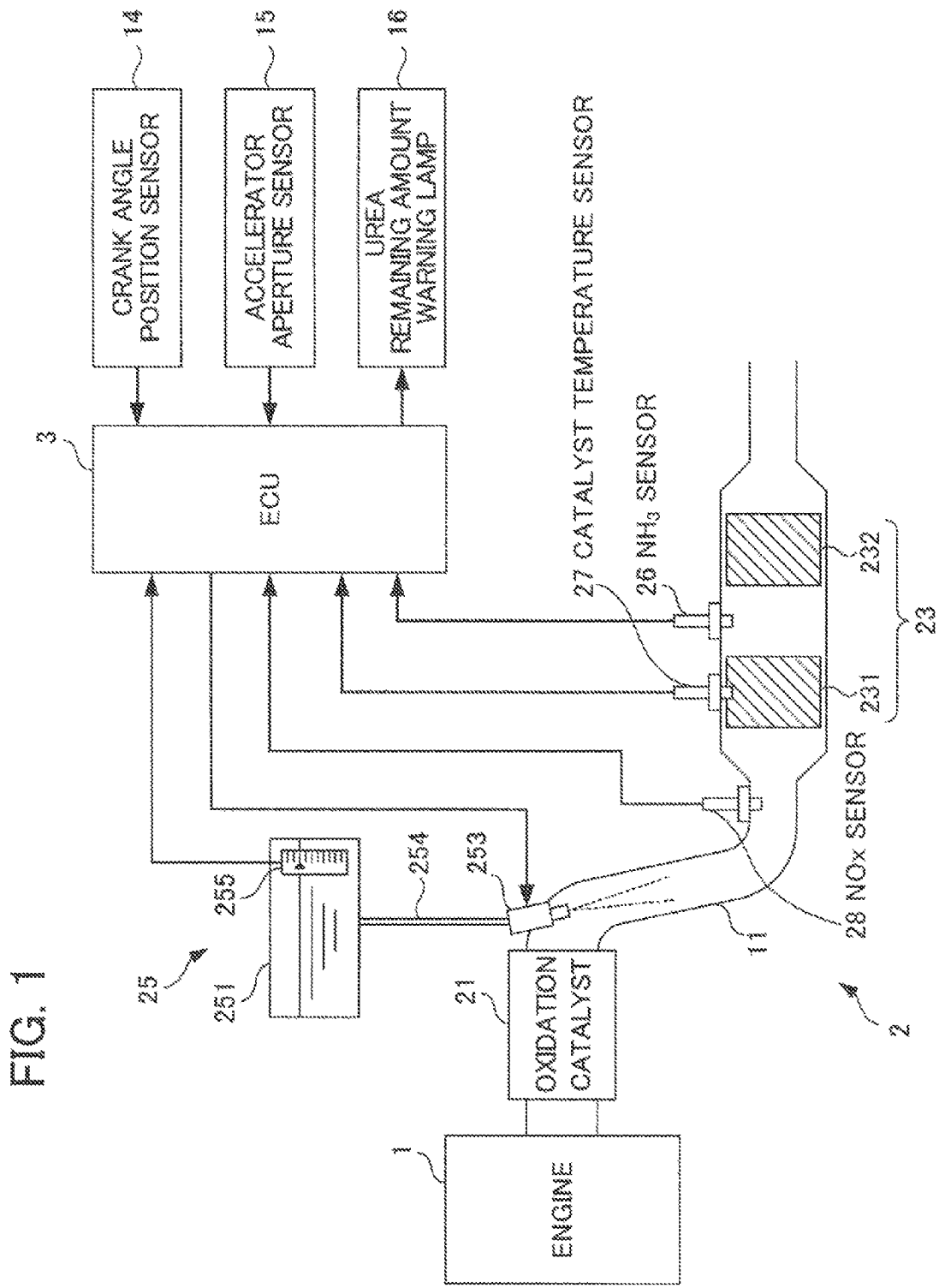
FIG. 1 is a schematic diagram showing a configuration of an internal combustion engine and an exhaust purification apparatus thereof according to one embodiment of the present invention.

EXPLANATION OF REFERENCE NUMERALS 1 engine (internal combustion engine)
11 exhaust channel (exhaust channel)
2 exhaust purification apparatus
23 urea selective reduction catalyst (selective reduction catalyst)
231 first selective reduction catalyst
232 second selective reduction catalyst
25 urea injection device (reducing agent supply means)
26 ammonia sensor (ammonia concentration detection means)
28 NOx sensor
3 electronic control unit (first control input calculation means, second control input calculation means, third control input calculation means, reducing agent supply amount determination means, target ammonia concentration setting means)
4 feed-back controller (first control input calculation means, target ammonia concentration setting means)
41 target ammonia concentration setting portion (target ammonia concentration setting means)
42 sliding-mode controller (first control input calculation means)
5 feed-forward controller (second control input calculation means)
6 storage corrected input calculating portion (third control input calculation means)
7 adder (reducing agent supply amount determination means)

PREFERRED MODE FOR CARRYING OUT THE INVENTION

An embodiment of the present invention will be explained hereinafter while referring to the drawings.

FIG. 1 is a schematic diagram showing a configuration of an internal combustion engine (hereinafter referred to as "engine") 1 and an exhaust purification apparatus 2 thereof according to one embodiment of the present invention. The engine 1 is a gasoline engine of lean-burn operating type or diesel engine, and is mounted in a vehicle, which is not illustrated.

The exhaust purification apparatus 2 is configured to include an oxidation catalyst 21 provided in an exhaust channel 11 of the engine 1, a urea selective reduction catalyst 23 that is provided in the exhaust channel 11 and purifies nitrogen oxides (hereinafter referred to as "NOx") in the exhaust flowing through this exhaust channel 11 under the presence of a reducing agent, a urea injection device 25 that supplies urea water as a reducing agent into the exhaust channel 11 on an upstream side of the urea selective reduction catalyst 23, and an electronic control unit (hereinafter referred to as "ECU") 3.

The urea injection device 25 is provided with a urea tank 251 and a urea injection valve 253.

The urea tank 251 stores the urea water, and is connected to the urea injection valve 253 via a urea supply pipe 254 and a urea pump, which is not illustrated. A urea level sensor 255 is provided to this urea tank 251. This urea level sensor 255 detects the water level of the urea water in the urea tank 251, and outputs a detection signal substantially proportional to this water level to the ECU 3.

The urea injection valve 253 is connected to the ECU 3, operates according to a control signal, from the ECU 3, and injects urea water into the exhaust channel 11 in accordance with this control signal. In other words, urea injection control is executed.

The oxidation catalyst 21 is provided more on an upstream side in the exhaust channel 11 than the urea selective reduction catalyst 23 and the urea injection valve 253, converts NO in the exhaust to $NO_2$, thereby promoting reduction of NOx in the urea selective reduction catalyst 23.

The urea selective reduction catalyst 23 is configured to include a first selective reduction catalyst 231, and a second selective reduction catalyst 232 that is provided in the exhaust channel 11 more on a downstream side than the first selective reduction catalyst 231. This first selective reduction catalyst 231 and second selective reduction catalyst 232 each selectively reduce NOx in the exhaust under an atmosphere in which urea water is present. More specifically, when urea water is injected by the urea injection device 25, ammonia is generated from urea in this first selective reduction catalyst 231 and second selective reduction catalyst 232, and the NOx in the exhaust is selectively reduced by way of this ammonia.

A detailed configuration of this urea selective reduction catalyst 23 will be explained in detail later while referring to FIGS. 2 and 3.

In addition to an ammonia sensor 26, catalyst temperature sensor 27, and NOx sensor 28, a crank angle position sensor 14, accelerator opening sensor 15, and urea remaining amount warning light 16 are connected to the ECU 3.

The ammonia sensor 26 detects a concentration of ammonia in exhaust (hereinafter referred to as "ammonia concentration") $NH3_{CONS}$ in the exhaust channel 11 between the first selective reduction catalyst 231 and the second selective reduction catalyst 232, and supplies a detection signal substantially proportional to the ammonia concentration $NH3_{CONS}$ thus detected to the ECU 3.

The catalyst temperature sensor 27 detects a temperature (hereinafter referred to as "catalyst temperature") $T_{SCR}$ of the first selective reduction catalyst 231, and supplies a detection signal substantially proportional to the catalyst temperature $T_{SCR}$ thus detected to the ECU 3.

The NOx sensor 28 detects a concentration of NOx in the exhaust (hereinafter referred to as "NOx concentration") $NOX_{CONS}$ flowing into the first selective reduction catalyst 231, and supplies a detection signal substantially proportional to the NOx concentration $NOX_{CONS}$ thus detected to the ECU 3.

The crank angle position sensor 14 detects a rotation angle of the crank shaft of the engine 1 as well as generating a pulse at every 1° of crank angle, and supplies this pulse signal to the ECU 3. A revolution speed NE of the engine 1 is calculated based on this pulse signal by the ECU 3. The crank angle position sensor 14 further generates a cylinder discriminating pulse at a predetermined crank angle position of a specific cylinder, and supplies this to the ECU 3.

The accelerator opening sensor 15 detects a depression amount (hereinafter referred to as "accelerator opening") AP of the accelerator pedal, which is not illustrated, of the vehicle, and supplies a detection signal substantially proportional to the accelerator opening AP thus detected to the ECU 3. A demanded torque TRQ of the engine 1 is calculated in accordance with this accelerator opening AP and revolution speed NE by the ECU 3. Hereinafter, this demanded torque TRQ is set as a load parameter representing the load of the engine 1.

The urea remaining amount warning light 16 is provided in the instrument panel of the vehicle, for example, and illuminates in response to the remaining amount of urea water in the urea tank 251 having decreased past a predetermined remaining amount. With this, the fact that the remaining amount of urea water in the urea tank 251 has decreased is warned to the driver.

Detailed Configuration of Urea Selective Reduction Catalyst

Incidentally, the first selective reduction catalyst 231 and the second selective reduction catalyst 232 of the aforementioned urea selective reduction catalyst 23 each have a function of reducing NOx in the exhaust with ammonia generated from urea, as well as having a function of storing only a predetermined amount of the ammonia thus generated.

Hereinafter, the ammonia amount stored in the first selective reduction catalyst 231 is set as a first storage amount, and the ammonia amount that can be stored in the first selective reduction catalyst 231 is set as a first storage capacity. In addition, an ammonia amount stored in the second selective reduction catalyst 232 is set as a second storage amount, and an ammonia amount that can be stored in the second selective reduction catalyst 232 is set as a second storage capacity.

The ammonia stored in this way is also consumed as appropriate in the reduction of NOx in the exhaust.

As a result, the NOx reduction rates of the selective reduction catalysts 231 and 232 increase in accordance with the first and second storage amounts increasing. In addition, in a case such as the supply amount of the urea water being small relative to the amount of NOx generated, the ammonia stored will be consumed in the reduction of NOx by serving to compensate for an insufficiency of this urea water.

Herein, in a case of the ammonia generated exceeding the storage-capacities of each of the selective reduction catalysts 231 and 232, the ammonia generated is discharged to a downstream side of each of the selective reduction catalysts 231 and 232. In this way, the ammonia is not stored in each of the selective reduction catalysts 231 and 232, and the discharging to the downstream sides of each is hereinafter referred to as "ammonia slip".

In order to continuously maintain the NOx reduction rate to be high in such selective reduction catalysts 231 and 232, it is preferable to continuously maintain a state in which ammonia of amounts close to the storage capacities of each is stored in these selective reduction catalysts 231 and 232.

However, in such a state in which ammonia of an amount close to the storage capacity is stored, it is easy for ammonia slip to occur, and there is concern that ammonia may be discharged out of the vehicle. In particular, it is preferred that ammonia slip of the second selective reduction catalyst 232 is prevented as much as possible.

Taking account of these points, optimal forms of the first selective reduction catalyst 231 and the second selective reduction catalyst 232 for maintaining a high NOx reduction rate and preventing ammonia from discharging out of the vehicle will be explained while referring to FIGS. 2 and 3.

FIG. 2 shows relationships between the NOx concentration, ammonia concentration, and storage amount of ammonia in the selective reduction catalyst. More specifically, FIG. 2(a) shows the above relationships of a comparative example in which a NOx sensor is provided on a downstream side of one selective reduction catalyst (1 BED+NOx sensor layout), FIG. 2(b) shows the above relationships of a comparative example in which an ammonia sensor is provided on a downstream side of one selective reduction catalyst (1 BED+$NH_3$ sensor layout), and FIG. 2(c) shows the above relationships of the present embodiment in which an ammonia sensor is provided between two selective reduction catalysts (the first selective reduction catalyst and the second selective reduction catalyst)(2 BED+MID-$NH_3$ sensor layout).

Figure 3:
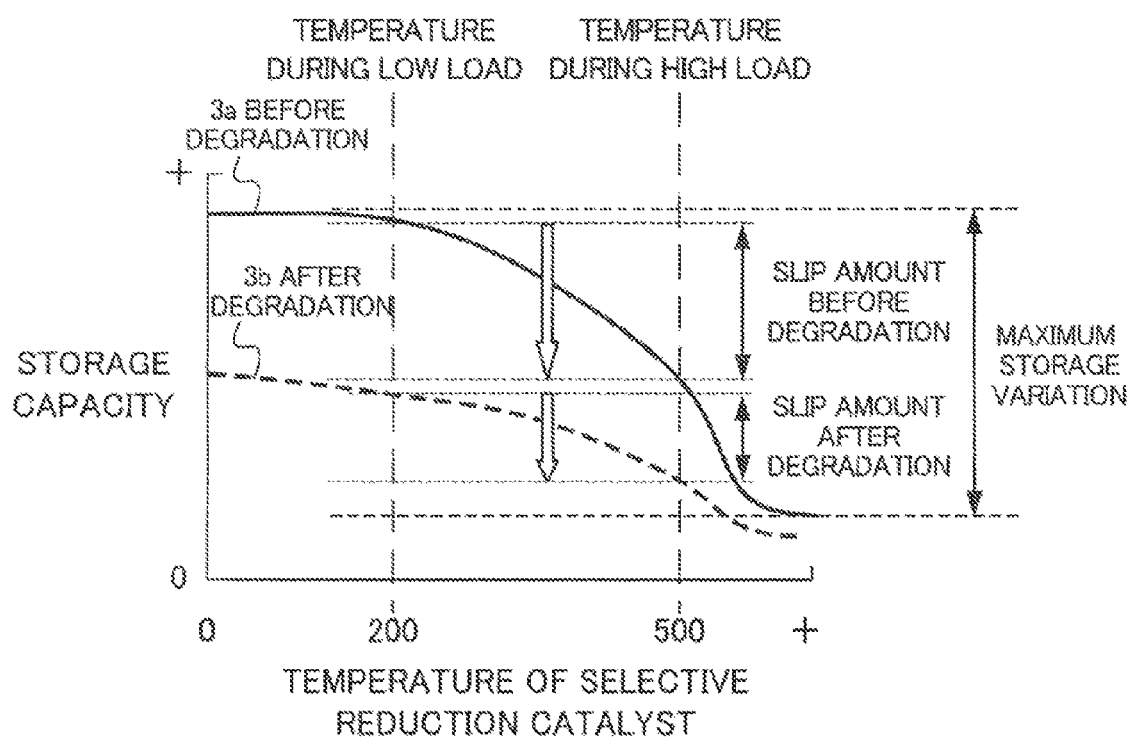
FIG. 3 is a graph showing a relationship between the storage capacity and temperature of the selective reduction catalyst according to the embodiment.

FIG. 3 is a graph showing a relationship between the storage capacity and the temperature of the selective reduction catalyst. In FIG. 3, the solid line 3a shows a relationship between the storage capacity and catalyst temperature of the catalyst before degradation, and the dotted line 3b shows a relationship between the storage capacity and catalyst temperature of the catalyst after degradation.

In the layout shown in FIG. 2(a), for example, the NOx reduction rate in the selective reduction catalyst can be maintained to be high by controlling the supply amount of urea water based on the output from the NOx sensor. In a case of performing such control, since the amount of NOx discharged from the engine and the supply amount of urea water necessary in reduction of this NOx are in a roughly balanced state, the ammonia generated from the urea water is consumed in the reduction of NOx, and the ammonia stored in the selective reduction catalyst and the ammonia slip of the selective reduction catalyst are both small. As a result, the storage amount of ammonia in the selective reduction catalyst has little chance, and there is a tendency to be small relative to the storage capacity thereof.

In other words, in a case of having appropriately performed the aforementioned such control of the supply amount of urea water, the storage amount of the selective reduction catalyst will be kept approximately constant. However, in a case of the operating state of the engine suddenly changing, in a case of the selective reduction catalyst degrading over time, in a case of the temperature suddenly changing, or the like, the supply amount of urea water may shift from the appropriate amount, and there is concern that the storage amount will become "0" and the NOx reduction rate will decline, or the storage amount will saturate and excessive ammonia slip will occur.

Therefore, with the layout shown in FIG. 2(a), control of the storage amount of ammonia is difficult, and it is difficult to both continuously improve the reduction rate of NOx and prevent ammonia slip.

In the layout shown in FIG. 2(b), in a case of performing control of the supply amount of urea water so as to maintain the NOx reduction rate to be high based on the output from the ammonia sensor, it is necessary to maintain a state in which slight ammonia slip occurs in order to obtain an output from the ammonia sensor. As a result, the storage amount of ammonia in the selective reduction catalyst normally enters a saturated state, as shown in FIG. 2(b).

In a case of having maintained a state in which the storage amount is saturated in this way, for example, the NOx reduction rate during transition until the generation of ammonia ends can be continuously maintained to be high due to ammonia stored, even if in a state in which NOx of a great amount is temporarily generated by sudden acceleration of the vehicle such that the generation of ammonia for reducing this NOx cannot keep pace.

Incidentally, as shown in FIG. 3, the storage capacity of the selective reduction catalyst changes according to the catalyst temperature. More specifically, the storage capacity becomes smaller with the catalyst temperature increasing.

Therefore, with the aforementioned layout shown in FIG. 2(b), in a case of the vehicle transitioning from a low load operating state to a high load operating state, and the catalyst temperature having transitioned from a low temperature (e.g., 200° C.) state to a high temperature (e.g., 500° C.) state, excessive ammonia slip may occur in response to this temperature difference, due to maintaining a state in which the storage amount is saturated.

Returning to FIG. 2, with the layout of the present embodiment shown in FIG. 2(c), the ammonia sensor 26 is provided between the first selective reduction catalyst 231 and the second selective reduction catalyst 232.

With this layout, it is possible to maintain a state in which ammonia from the first selective reduction catalyst 231 is saturated, similarly to the aforementioned layout shown in FIG. 2(b), by performing control of the supply amount of urea water so that the value of the ammonia concentration detected by the ammonia sensor 26 is a value larger than "0". With this, a high NOx reduction rate can be maintained in the first selective reduction catalyst 231.

In addition, even if the reduction of NOx is insufficient in the first selective reduction catalyst 231, it is possible to maintain the NOx reduction rate to be high with the first selective reduction catalyst 231 and the second selective reduction catalyst 232 overall, similarly to the layout shown in FIG. 2(a), by causing this residual NOx and ammonia slipped to the second selective reduction catalyst 232 to react in the second selective reduction catalyst 232.

In addition, it is possible to continuously maintain the NOx reduction rate to be high during transition, such as during the aforementioned sudden acceleration of the vehicle until the generation of ammonia ends, similarly to the layout shown in FIG. 2(b), by making a state in which the ammonia is saturated in the first selective reduction catalyst 231.

In addition, although ammonia slip occurs with the first selective reduction catalyst 231 in this way, the ammonia discharged from this first selective reduction catalyst 231 is either stored in the second selective reduction catalyst 232 or consumed in the reduction of NOx in the second selective reduction catalyst 232. With this, it is possible to maintain a high NOx reduction rate for the first selective reduction catalyst 231 and the second selective reduction catalyst 232 overall, as well as suppressing ammonia from being discharged downstream of the second selective catalyst 232.

In addition, in order to prevent the occurrence of excessive ammonia slip in a case of transitioning from a low load operating state to a high load operating state, and the catalyst temperature having transitioned from low temperature to high temperature, the second storage capacity is preferably designed to be larger than a difference between a maximum and minimum of the first storage capacity. By designing in this way, the ammonia released from the first selective reduction catalyst 231 can be stored in the second selective reduction catalyst 232. With this, ammonia can be further suppressed from discharging to downstream of the second selective reduction catalyst 232.

In addition, as shown in FIG. 3, the storage capacity decreases with degradation of the catalyst. As a result, the amount of ammonia that is released in response to a sudden change in operating state and catalyst temperature is larger before degradation than after degradation. Therefore, the second storage capacity is preferably designed to be larger than the difference between the maximum and minimum (maximum capacity difference) of the first storage capacity of the first selective reduction catalyst before degradation. With this, it is possible to prevent ammonia slip of the second selective reduction catalyst more reliably.

Returning to FIG. 1, the ECU 3 is provided with an input circuit having functions such as of shaping input signal waveforms from every kind of sensor, correcting the voltage levels to predetermined levels, and converting analog signal values to digital signal values, and a central processing unit (hereinafter referred to as "CPU"). In addition to this, the ECU 3 is provided with a storage circuit that stores every kind of calculation program executed by the CPU, calculation results, and the like, and an output circuit that outputs control signals to the engine 1, urea injection valve 253, and the like.

Figure 4:
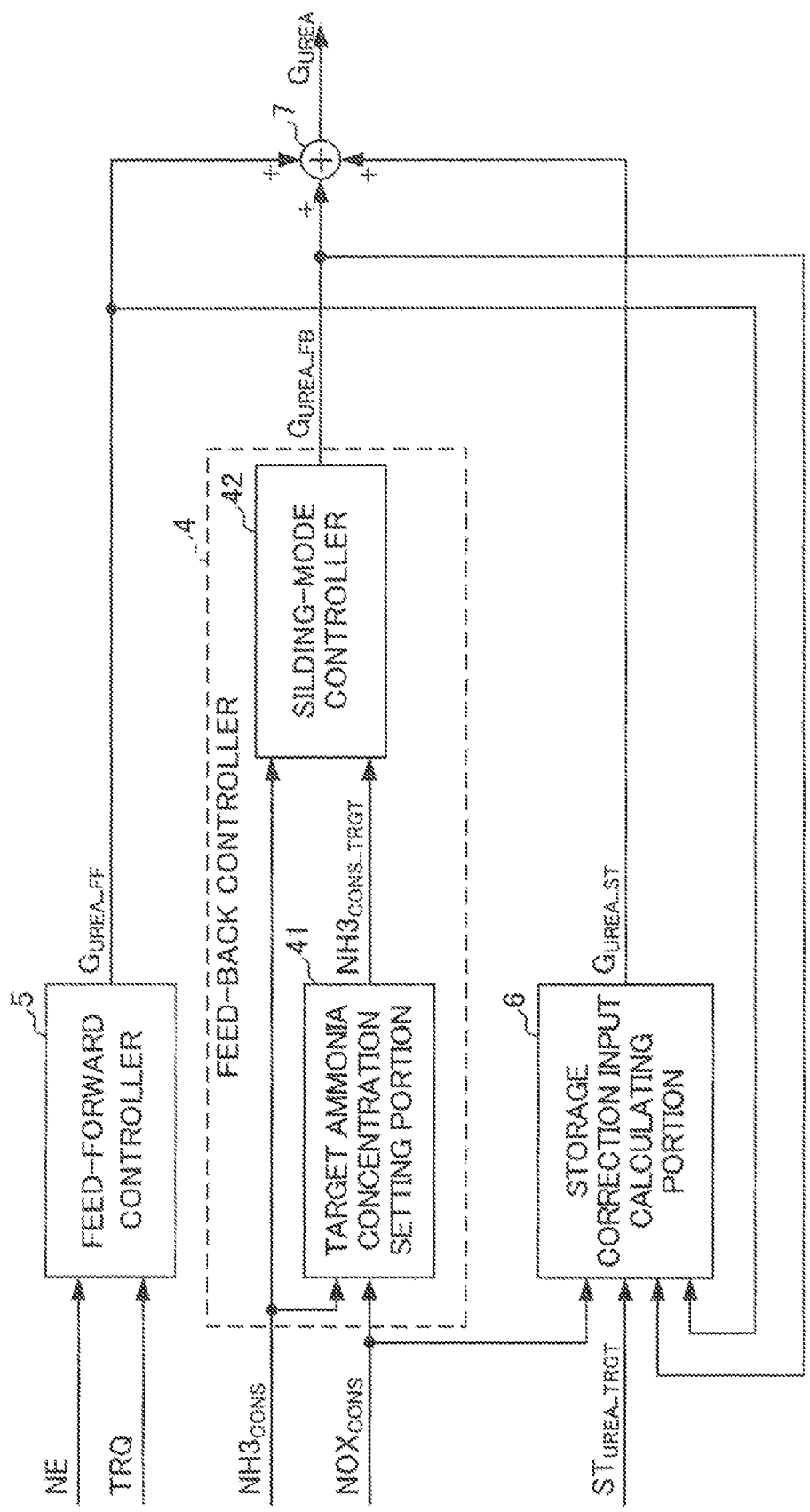
FIG. 4 is a block diagram showing a configuration of a module that calculates a urea injection amount by a urea injection valve according to the embodiment.

FIG. 4 is a block diagram showing a configuration of a module that calculates a urea injection amount $G_{UREA}$ (supply amount of urea water) by the urea injection valve. The functions of this module are realized by processing executed by the ECU 3.

The module shown in FIG. 4 is configured to include a feed-back controller 4, feed-forward controller 5, storage corrected input calculating portion 6, and adder 7.

The feed-back controller 4 is provided with a target ammonia concentration setting portion 41 and a sliding-mode controller 42.

The target ammonia concentration setting portion 41 sets the target concentration (hereinafter referred to as "target ammonia concentration") $NH3_{CONS\_TRGT}$ of the ammonia concentration (hereinafter referred to as "detected ammonia concentration") $NH3_{CONS}$ detected by the ammonia sensor, as will be explained in detail later while referring to FIGS. 22 to 27. It should be noted that this target ammonia concentration $NH3_{CONS\_TRGT}$ is set to a value larger than "0", as will be explained in detail later.

The sliding-mode controller 24 calculates a feed-back injection amount (hereinafter referred to as "FB injection amount") $G_{UREA\_FB}$ relative to a urea injection amount $G_{UREA}$, as a control input for controlling the detected ammonia concentration $NH3_{CONS}$ so as to converge to the target ammonia concentration $NH3_{CONS\_TRGT}$ thus set, as will be explained in detail later while referring to FIGS. 5 to 10.

The feed-forward controller 5 calculates a feed-forward injection amount (hereinafter referred to as "FF injection amount") $G_{UREA\_FF}$ relative to the urea injection amount $G_{UREA}$, as a control input for controlling so that the NOx reduction rate in the selective reduction catalyst maintains a maximum value, in accordance with the amount of NOx in the exhaust changing according to the operating state of the engine, as will be explained in detail later while referring to FIGS. 11 to 13.

The storage corrected input calculating portion 6 estimates the first storage amount of the first selective reduction catalyst, and calculates a corrected injection amount $G_{UREA\_ST}$ relative to the urea injection amount $G_{UREA}$ as a control input for controlling so that this first storage amount thus estimated converges to a predetermined storage amount $ST_{UREA\_TRGT}$, as will be explained in detail later while referring to FIGS. 14 to 21.

The adder 7 determines the urea injection amount $G_{UREA}$ by adding the FB injection amount $G_{UREA\_FB}$ calculated by the feed-back controller 4, the FF injection amount $G_{UREA\_FF}$ calculated by the feed-forward controller 5, and the corrected injection amount $G_{UREA\_ST}$ calculated by the storage corrected input calculating portion 6, as shown in the following formula (1).

$$G_{UREA}(k) = G_{UREA\_FB}(k) + G_{UREA\_FF}(k) + G_{UREA\_ST}(k) \quad (1)$$

Herein, the notation (k) is a notation expressing discretized time, and indicates being data detected or calculated every predetermined control cycle. In other words, in a case of the symbol (k) being data detected or calculated in a current control timing, the notation (k−1) indicates being data detected or calculated in a previous control timing. It should be noted that the notation (k) is omitted as appropriate in the following explanation.

Configuration of Sliding-Mode Controller

A detailed configuration of the sliding-mode controller will be explained while referring to FIGS. 5 to 10.

As described above, with the sliding-mode controller, the FB injection amount $G_{UREA\_FB}$ is calculated so that the detected ammonia concentration $NH3_{CONS}$ converges to the target ammonia concentration $NH3_{CONS\_TRGT}$ set by the target ammonia concentration setting portion. The two problems that the inventors of the present application observed when performing feed-back control based on the output value $NH3_{CONS}$ of such an ammonia sensor will be explained.

(1) Detection Resolution of Ammonia Sensor

As described above, existing NOx sensors in the detection principles thereof are sensitive not only to NOx, but also to ammonia. On the other hand, it is known that an ammonia sensor sensitive to only ammonia is developable without being sensitive to NOx. However, there is a limit in detection resolution for such an ammonia sensor, and further, there is individual variability in this detection resolution, which changes with degradation over time. As a result, it is difficult to closely control the output value $NH3_{CONS}$ from the ammonia sensor to the target ammonia concentration $NH3_{CONS\_TRGT}$.

(2) Responsiveness Contrast Between NOx Reduction Rate and Ammonia Slip

Even if the problem related to the detection resolution of the above such ammonia sensor were solved, there would be a problem of the responsiveness contrast to the urea injection amount $G_{UREA}$ between the NOx reduction rate and ammonia slip of the selective reduction catalyst. More specifically, the NOx reduction rate of the selective reduction catalyst has a smaller response lag and larger sensitivity to the urea injection amount $G_{UREA}$, than the ammonia slip of this selective reduction catalyst.

Figure 5:
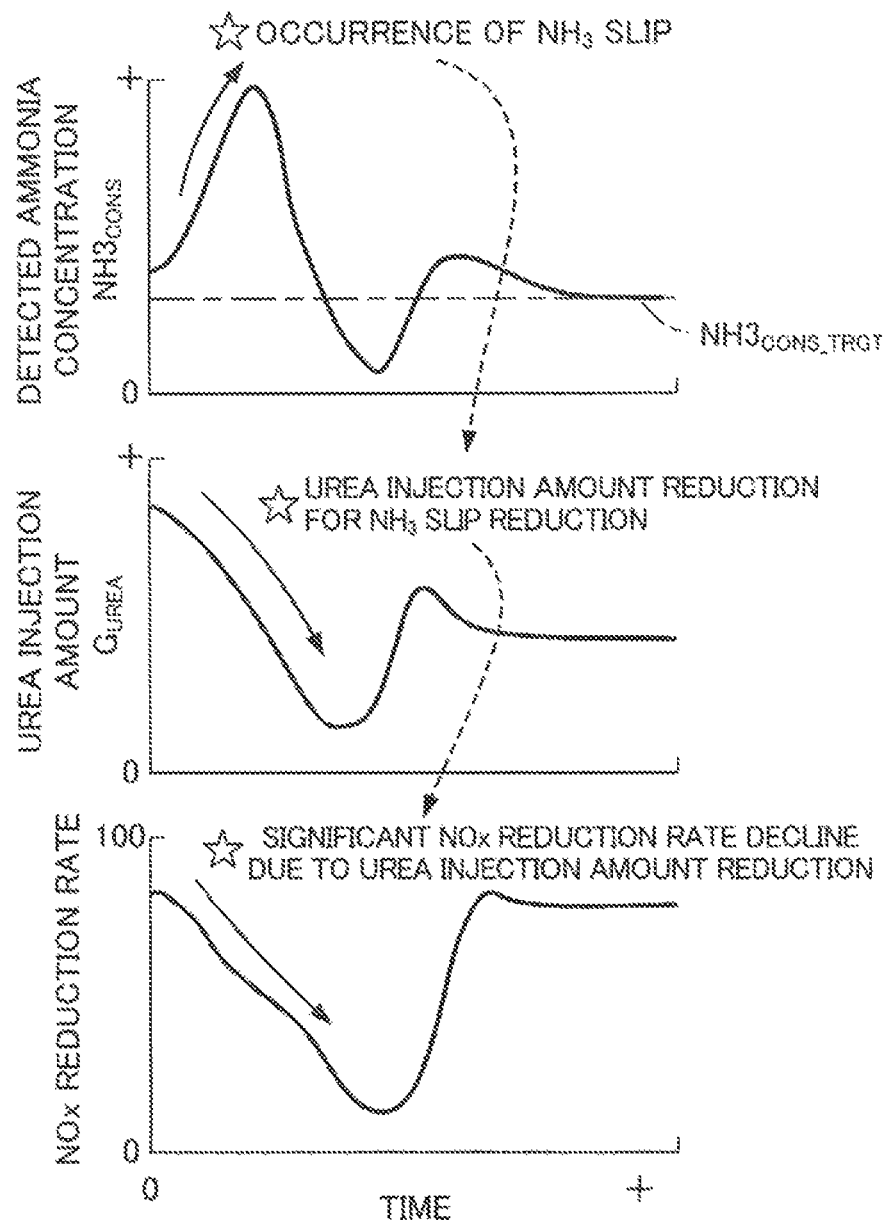
FIG. 5 shows the change of NOx reduction rate in a case of the urea injection amount having been controlled so that an output value of an ammonia sensor closely converges with a target ammonia concentration.

FIG. 5 shows the change of NOx reduction rate in a case of the urea injection amount $G_{UREA}$ having been controlled so that an output value $NH3_{CONS}$ of the ammonia sensor closely converges with a target ammonia concentration $NH3_{CONS\_TRGT}$.

As shown in FIG. 5, when the output value $NH3_{CONS}$ of the ammonia sensor suddenly increases, and, in response to the occurrence of ammonia slip having been detected, the urea injection amount $G_{UREA}$, for suppressing this ammonia slip decreases, the NOx reduction rate declines considerable before the ammonia slip is suppressed. At this time, when the urea injection amount $G_{UREA}$ is made to continuously decrease so that the detected ammonia concentration $NH3_{CONS}$ closely converges with the target ammonia concentration $NH3_{CONS\_TRGT}$, the NOx reduction rate further declines.

Taking the above such two problems into consideration, control is executed in the present embodiment based on a concept such as that exemplified below.

Figure 6:
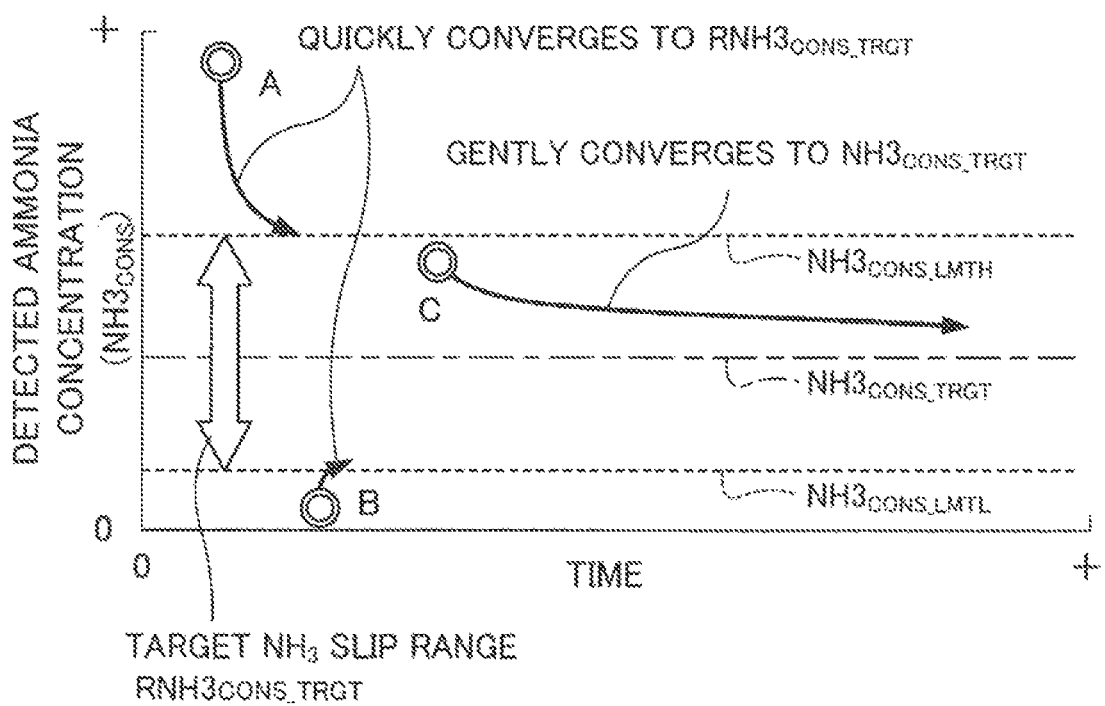
FIG. 6 is a graph for illustrating the control concept of a sliding-mode controller according to the embodiment.

FIG. 6 is a graph for illustrating the control concept of the sliding-mode controller. In FIG. 6, the horizontal axis indicates the time, and the vertical axis indicates the detected ammonia concentration $NH3_{CONS}$.

In the present embodiment, relative to a target ammonia concentration $NH3_{CONS\_TRGT}$ (>0) set by way of a target ammonia concentration setting portion, a target ammonia slip range $RNH3_{CONS\_TRGT}$, which is defined by a lower limit $NH3_{CONS\_LMTL}$ that is smaller and an upper limit $NH3_{CONS\_LMTH}$ that is larger than this target ammonia concentration $NH3_{CONS\_TRGT}$, is set, and the FB injection amount $G_{UREA\_FB}$ is calculated so that the detected ammonia concentration $NH3_{CONS\_TRGT}$ falls in this target ammonia slip range $RNH3_{CONS\_TRGT}$. Herein, the target ammonia slip range $RNH3_{CONS\_TRGT}$ is preferably set considering the detection resolution of the ammonia sensor.

Furthermore, upon setting the target ammonia slip range $RNH3_{CONS\_TRGT}$ in the above way, the FB injection amount $G_{UREA\_FB}$ is calculated so as to show the following behavior in a case of the detected ammonia concentration $NH3_{CONS}$ being a value A (in a case of $NH3_{CONS\_LMTH} \leq NH3_{CONS}$), in a case of being a value B (in a case of $NH3_{CONS} <$ $NH3_{CONS\_LMTL}$), and in a case of being a value C (in a case of $NH3_{CONS\_LMTL} \leq NH3_{CONS} < NH3_{CONS\_LMTH}$).

In the case of $NH3_{CONS}$ being the value A, due to being a state in which excessive ammonia slip is generated for the target ammonia concentration $NH3_{CONS\_TRGT}$, the FB injection amount $G_{UREA\_FB}$ is calculated so that the detected ammonia concentration $NH3_{CONS}$ quickly converges with the target ammonia concentration $NH3_{CONS\_TRGT}$ without overshoot.

In the case of the $NH3_{CONS}$ being the value B, due to being in a state in which inadequate ammonia slip is generated for the target ammonia concentration $NH3_{CONS\_TRGT}$, the FB injection amount $G_{UREA\_FB}$ is calculated so that the detected ammonia concentration $NH3_{CONS}$ quickly converges with the target ammonia concentration $NH3_{CONS\_TRGT}$ without overshoot.

In the case of the $NH3_{CONS}$ being the value C, due to being in a state in which neither inadequate or excessive ammonia slip is generated for the target ammonia concentration $NH3_{CONS\_TRGT}$, the FB injection amount $G_{UREA\_FB}$ is calculated so that the detected ammonia concentration $NH3_{CONS}$ gently converges with the target ammonia concentration $NH3_{CONS\_TRGT}$. In other words, the FB injection amount $G_{UREA\_FB}$ is calculated so as to restrict the detected ammonia concentration $NH3_{CONS}$ to within the target ammonia slip range $RNH3_{CONS\_TRGT}$.

Herein in particular, when comparing the case of $NH3_{CONS}$ being the value A or value B to being the value C, the convergence rate to the target ammonia concentration $NH3_{CONS\_TRGT}$ of the detected ammonia concentration $NH3_{CONS}$ in the case of being the value C is set to be slower than the convergence rate of being the value A or the value B.

With the present embodiment, the behavior of the detected ammonia concentration $NH3_{CONS}$ as described above is realized by response specific control that can set the convergence rate to the target ammonia concentration $NH3_{CONS\_TRGT}$ of the detected ammonia concentration $NH3_{CONS}$. This response specific control refers to the matter of control that can specify both the convergence rate and convergence behavior of deviation based on a function in which the convergence behavior of the deviation is defined.

Hereinafter, operations of a sliding-mode controller configured to be able to execute this response specific control will be explained.

First, the deviation between the ammonia concentration $NH3_{CONS}(k)$ detected by the ammonia sensor and the target $NH3_{CONS\_TRGT}(k)$ is calculated as shown in the following formula (2), and this is defined as a slip amount deviation $E_{NH3}(k)$.

$$E_{NH3}(k) = NH3_{CONS}(k) - NH3_{CONS\_TRGT}(k) \quad (2)$$

Figure 9:
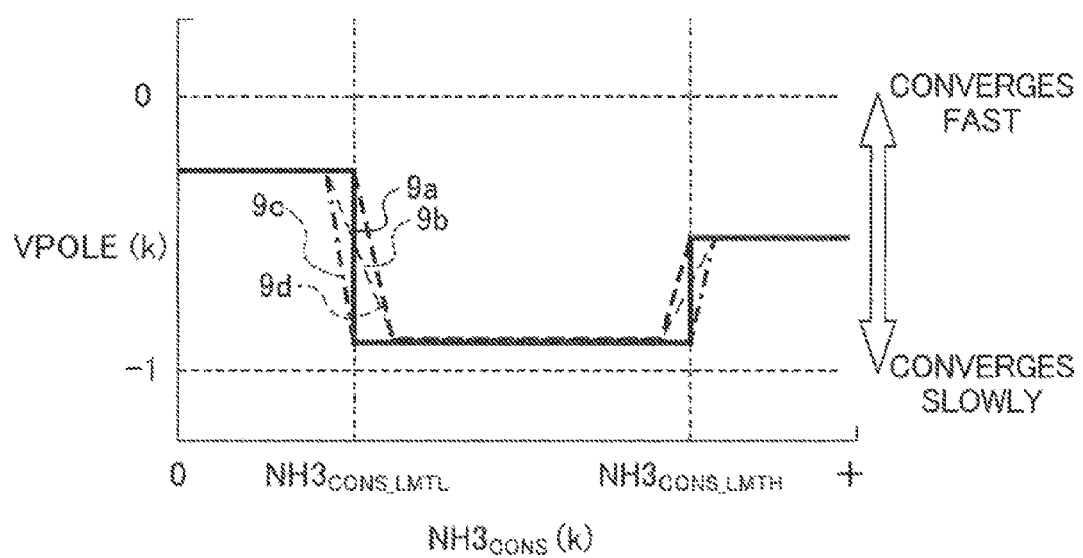
FIG. 9 is a graph showing a configuration of a VPOLE setting table according to the embodiment.

Next, a conversion function setting parameter $VPOLE(k)$ appropriate for the detected ammonia concentration $NH3_{CONS}(k)$ is calculated, based on a predetermined VPOLE setting table as shown in FIG. 9 described later. Furthermore, as shown in the following formula (3), the sum of the product of this $VPOLE(k)$ and the slip amount deviation $E_{NH3}(k-1)$ during a previous control, and $E_{NH3}(k)$ is calculated, and this is defined as a conversion function $\sigma(k)$.

$$\sigma(k) = E_{NH3}(k) + VPOLE(k)E_{NH3}(k-1) \quad (3)$$

Herein, the relationship between the conversion function setting parameter $VPOLE(k)$ and the convergence rate of the slip amount deviation $E_{NH3}(k)$ will be explained.

Figure 7:
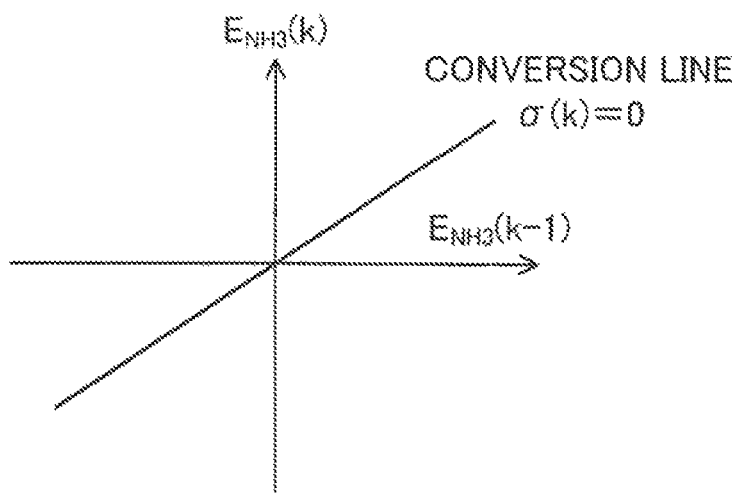
FIG. 7 is a graph showing a phase plane between slip amount deviation during a previous control and the slip amount deviation during a present control.

FIG. 7 is a graph showing a phase plane with the horizontal axis set as the slip amount deviation $E_{NH3}(k-1)$ during a previous control, and the vertical axis defined as the slip amount deviation $E_{NH3}(k)$ during a present control.

In this phase plane, the combination of the slip amount deviation $E_{NH3}(k)$ and $E_{NH3}(k-1)$ satisfying $\sigma(k)=0$ gives a straight line having a slope of $-VPOLE(k)$, as shown in FIG. 7. In particular, this straight line is called a conversion line. In addition, as shown in FIG. 7, since $E_{NH3}(k-1)$ becomes greater than $E_{NH3}(k)$ by setting $-VPOLE$ to be a value less than "1" and larger than "0", the slip amount deviation $E_{NH3}(k)$ comes to converge to "0". The sliding-mode control is control focused on the behavior of the deviation $E_{NH3}(k)$ on this conversion line.

In other words, robust control against noise and modeling error is realized by performing control so that the combination of the slip amount deviation $E_{NH3}(k)$ during the present control and the slip amount deviation $E_{NH3}(k-1)$ during the previous control (hereinafter referred to as "deviation condition amount") to appear on this conversion line, and the detected ammonia concentration $NH3_{CONS}$ can be made to converge to the target ammonia concentration $NH3_{CONS\_TRGT}$ thereof without overshooting.

Figure 8:
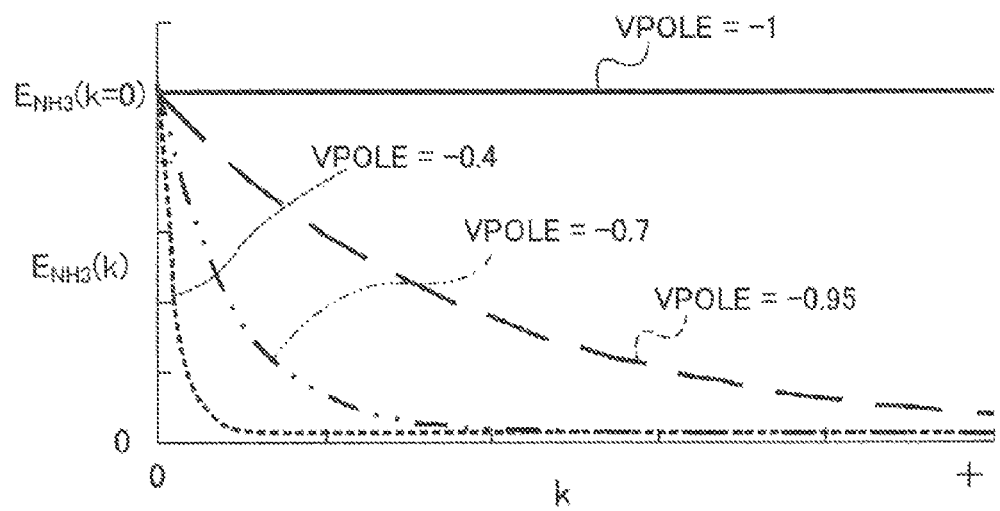
FIG. 8 is a graph showing a relationship between a conversion function setting parameter and a convergence time of the slip amount deviation according to the embodiment.

FIG. 8 is a graph showing a relationship between a conversion function setting parameter VPOLE and a convergence time of the slip amount deviation $E_{NH3}$. Herein, the horizontal axis indicates the convergence time of the slip amount deviation $E_{NH3}$, and the vertical axis indicates the slip amount deviation $E_{NH3}$. In addition, in this FIG. 8, cases are shown in which VPOLE is respectively "–1", "–0.95", "–0.7", and "–0.4". As shown in FIG. 8, when VPOLE approaches "0", the slip amount deviation $E_{NH3}$ shows exponential decay behavior relative to "0", and the convergence rate thereof quickens.

In addition, when VPOLE approaches "–1", the convergence rate slows while maintaining the exponential decay behavior. In particular, in a case of VPOLE being "–1", $E_{NH3}$ is maintained at the initial deviation $E_{NH3}(k=0)$ at the control onset.

FIG. 9 is a graph showing a configuration of a VPOLE setting table. Herein, the horizontal axis indicates the detected ammonia concentration $NH3_{CONS}(k)$, and the vertical axis indicates the conversion function setting parameter $VPOLE(k)$. The VPOLE setting table shown in FIG. 9 is a parameter set in order to realize the behavior control explained referring to the aforementioned FIG. 6, and shows the four VPOLE setting tables indicated by lines 9a, 9b, 9c, and 9d as specific examples.

As described above, the convergence rate in a case of the detected ammonia concentration $NH3_{CONS}$ being at least $NH3_{CONS\_LMTL}$ and smaller than $NH3_{CONS\_LMTH}$ (in a case of $NH3_{CONS\_LMTL} \leq NH3_{CONS} < NH3_{CONS\_LMTH}$) is set to be slower than the convergence rate in the case of the detected ammonia concentration $NH3_{CONS}$ being at least $NH3_{CONS\_LMTH}$ (in a case of $NH3_{CONS\_LMTH} \leq NH3_{CONS}$) and in a case of the detected ammonia concentration $NH3_{CONS}$ being less than $NH3_{CONS\_LMTL}$ (in a case of $NH3_{CONS} < NH3_{CONS\_LMTH}$).

Then, as shown in FIG. 9, in a case of $NH3_{CONS\_LMTL} \leq NH3_{CONS} < NH3_{CONS\_LMTH}$, VPOLE is set near "–1" (specifically, VPOLE≈–0.95), and in a case of $NH3_{CONS\_LMTH}$ being no more than $NH3_{CONS}$ and in a case of $NH3_{CONS}$ being less than $NH3_{CONS\_LMTH}$, VPOLE is set near "0" (specifically, VPOLE≈–0.4).

Based on the conversion function $\sigma(k)$ calculated in the above way, a reaching-law input $U_{RCH}(k)$, nonlinear input $U_{NL}(k)$, and adaptive-law input $U_{ADP}(k)$ are calculated, the sum of this reaching-law input $U_{RCH}(k)$, nonlinear input $U_{NL}(k)$, and adaptive-law input $U_{ADP}(k)$ is further calculated as shown in the following formula (4), and this is defined as the FB injection amount $G_{UREA\_FB}(k)$.

$$G_{UREA\_FB}(k)=U_{RCH}(k)+U_{NL}(k)+U_{ADP}(k) \quad (4)$$

The reaching-law input $U_{RCH}(k)$ is an input for placing the deviation condition amount on the conversion line, and is calculated by multiplying a predetermined reaching-law control gain $K_{RCH}$ by the conversion function $\sigma(k)$, as shown in the following formula (5).

$$U_{RCH}(k)=K_{RCH}\sigma(k) \quad (5)$$

The non-linear input $U_{NL}(k)$ suppresses non-linear modeling error, is an input for placing the deviation condition amount on the conversion line, and is calculated by multiplying a predetermined non-linear input gain $K_{NL}$ by $\text{sign}(\sigma(k))$, as shown in the following formula (6). Herein, $\text{sign}(\sigma(k))$ is a signum function, and becomes "1" when $\sigma(k)$ is a positive value and becomes "−1" when $\sigma(k)$ is a negative value.

$$U_{NL}(k)=K_{NL}\text{sign}(\sigma(k)) \quad (6)$$

The adaptive-law input $U_{ADP}(k)$ suppresses the influences of modeling error and noise, is an input for placing the deviation condition amount on the conversion line, and is calculated as the sum of the adaptive-law input during a previous control $U_{ADP}(k-1)$ and the product of the conversion function $\sigma(k)$ and a predetermined adaptive-law gain $K_{ADP}$, as shown in the following formula (7).

$$U_{ADP}(k)=U_{ADP}(k-1)+K_{ADP}\sigma(k) \quad (7)$$

It should be noted that this reaching-law input $U_{RCH}(k)$, non-linear input $U_{NL}(k)$, and adaptive-law input $U_{ADP}(k)$ are each set to optimum values based on experimentation so that the deviation condition amount is stably placed on the conversion line under the control plan described in detail while referring to FIG. 6.

Figure 10:
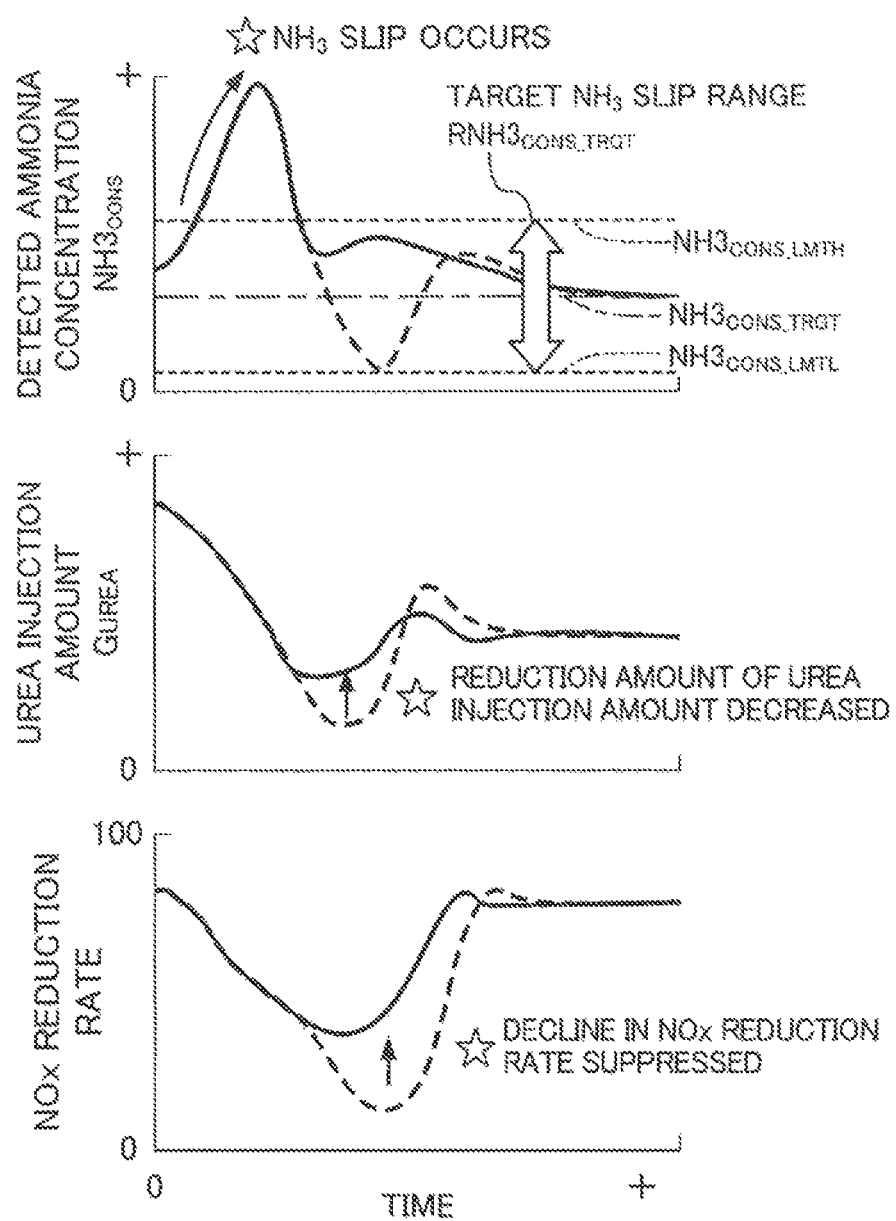
FIG. 10 shows the change in NOx reduction rate in a case of urea injection control having been executed using the sliding-mode controller according to the embodiment.

FIG. 10 shows the change in NOx reduction rate in a case of urea injection control having been executed using the above such sliding-mode controller of the present embodiment. More specifically, in FIG. 10, the upper graph shows the time change of the detected ammonia concentration $NH3_{CONS}$, the middle graph shows the time change of the urea injection amount $G_{UREA}$, and the lower graph shows the time change of the NOx reduction rate.

It should be noted that, in FIG. 10, the solid lines show control results of the present embodiment, and the dotted lines show control results in a case of urea injection control having been performed so that the detected ammonia concentration $NH3_{CONS}$ closely converges with the target ammonia concentration $NH3_{CONS\_TRGT}$.

According to the present embodiment, the urea injection amount $G_{UREA}$ is calculated so that the detected ammonia concentration $NH3_{CONS}$ floats within the target ammonia slip range $RNH3_{CONS\_TRGT}$. With this, the fluctuation in the urea injection amount $G_{UREA}$ can be made small.

In particular, in a case of control having been performed such that the detected ammonia concentration closely converges with the target ammonia concentration as shown by the dotted line, if excessive ammonia slip occurs, the urea injection amount for suppressing this ammonia slip will decrease drastically, and the NOx reduction rate may decline drastically due to this. According to the present embodiment, during the occurrence of such excessive ammonia slip, the amount of decrease in the urea injection amount $G_{UREA}$ is reduced, and the NOx reduction rate can be maintained to be high due to this.

In addition, according to the present embodiment, the convergence rate in a case of the detected ammonia concentration $NH3_{CONS}$ being within the target ammonia slip range $RNH3_{CONS\_TRGT}$ was set so as to be slower than the convergence rate in a case of being outside the target ammonia slip range $RNH3_{CONS\_TRGT}$.

With this, in the case of the detected ammonia concentration $NH3_{CONS}$ being outside the target ammonia slip range $RNH3_{CONS\_TRGT}$, the occurrence of excessive ammonia slip and a decline in NOx reduction rate are promptly suppressed. In addition, in the case of the detected ammonia concentration $NH3_{CONS}$ being within the target ammonia slip range $RNH3_{CONS\_TRGT}$, a great change in the urea injection amount $G_{UREA}$ can be prevented, and the NOx reduction rate can be prevented from declining significantly.

Configuration of Feed-Forward Controller

Next, a detailed configuration of the feed-forward control will be explained while referring to FIGS. 11 to 13.

As exemplified by the aforementioned problem (2), the responsiveness to the urea injection amount $G_{UREA}$ of the NOx reduction rate and ammonia slip of the selective reduction catalyst are different. More specifically, the ammonia slip of the selective reduction catalyst has a response lag to the urea injection amount $G_{UREA}$ that is larger than the NOx reduction rate of this selective reduction catalyst. The problem observed by the inventors of the present application when performing urea injection control in such a selective reduction catalyst will be explained.

(3) Decline in NOx Reduction Rate Due to Change in Operating State of Engine

Figure 11:
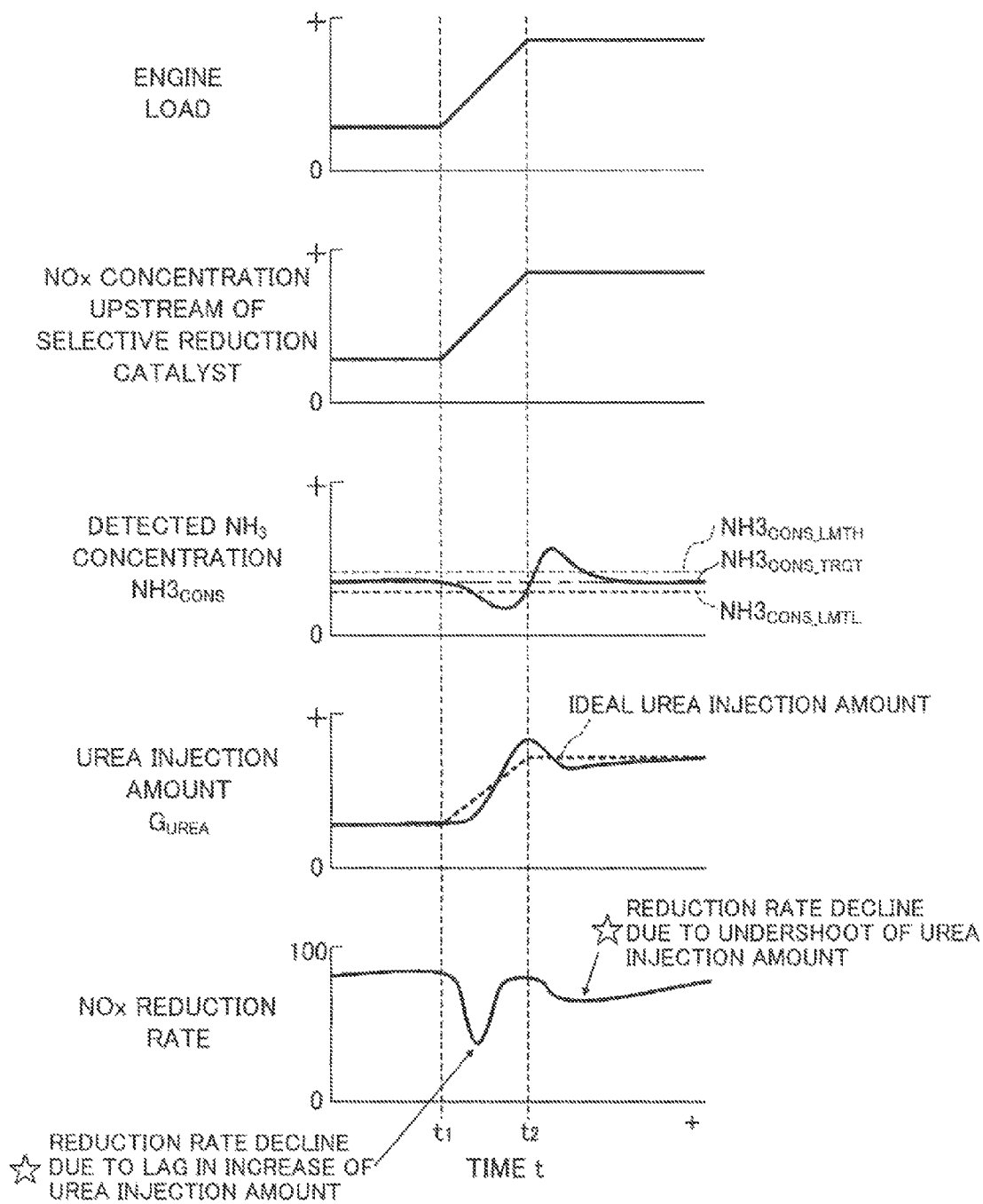
FIG. 11 shows relationships between engine load, NOx concentration upstream of the selective reduction catalyst, detected ammonia concentration, urea injection amount, and NOx reduction rate in a case of urea injection control having been executed by way of solely the sliding-mode controller according to the embodiment.

FIG. 11 shows relationships between an engine load, NOx concentration upstream of the selective reduction catalyst, detected ammonia concentration $NH3_{CONS}$, urea injection amount $G_{UREA}$, and NOx reduction rate in a case of urea injection control having been executed by way of solely the aforementioned sliding-mode controller.

As shown in FIG. 11, when the load of the engine rises from time $t_1$ to $t_2$, the NOx concentration on an upstream side of the selective reduction catalyst rises accompanying this rise in load. In this case, in order to prevent the NOx reduction rate from declining, it is necessary to increase the urea injection amount $G_{UREA}$ in accordance with the rise in NOx concentration. However, with the aforementioned sliding-mode controller, since feed-back control is performed based on the output value $NH3_{CONS}$ of the ammonia sensor, which has a larger response lag than the NOx reduction rate, the increased amount of urea injection amount $G_{UREA}$ will be delayed more than in an ideal case. As a result, the NOx reduction rate may decline.

In addition, when performing feed-back control based on the output value $NH3_{CONS}$ of the ammonia sensor, which has such a large response lag, it is easy for oscillatory behavior such as overshoot and undershoot to occur in the output value $NH3_{CONS}$ of the sensor. As a result, the urea injection amount $G_{UREA}$ will also oscillate, and it will be easy for a decline in the NOx reduction rate to occur due to undershoot such as that shown in FIG. 11.

Taking the above such problems into account, FF injection amount $G_{UREA\_FF}$ is calculated by the teed-forward controller based on the operating state of the engine in the present embodiment. More specifically, with this feed-forward controller, the FF injection amount $G_{UREA\_FF}$ is determined by way of a map search based on the revolution speed NE of the engine, and the load parameter TRQ representing the load of the engine, for example, as the operating state of the engine.

Figure 12:
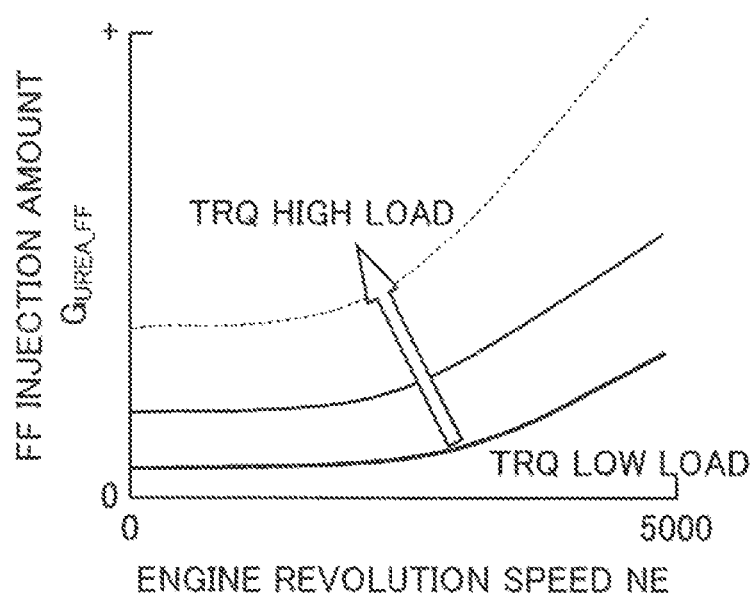
FIG. 12 is a graph showing an example of a control map for determining an FF injection amount according to the embodiment.

FIG. 12 is a graph showing an example of a control map for determining the FF injection amount $G_{UREA\_FF}$.

As shown in FIG. 12, with this control map, the FF injection amount $G_{UREA\_FF}$ is determined to be a higher value with the revolution speed NE or the load parameter TRQ of the engine becoming larger.

This is because, with a larger load parameter TRQ of the engine, the NOx emission amount increases from the combustion temperature of the air-fuel mixture rising, and with a higher revolution speed NE of the engine, the NOx emission amount per unit time increases.

Figure 13:
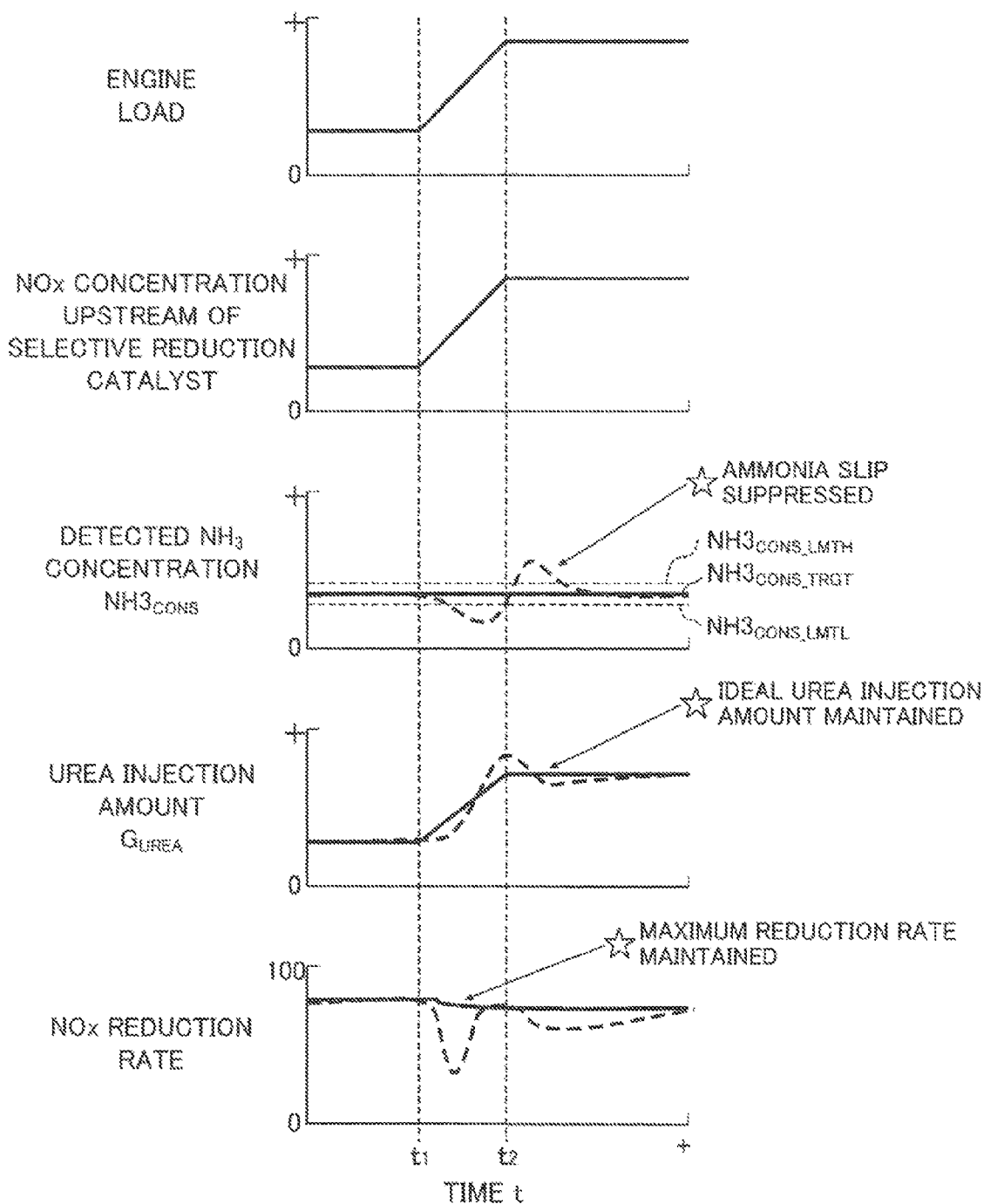
FIG. 13 shows relationships between an engine load, NOx concentration upstream of the selective reduction catalyst, detected ammonia concentration, urea injection amount, and NOx reduction rate in a case of urea injection control having been executed using a feed-forward controller according to the embodiment.

FIG. 13 shows relationships between an engine load, NOx concentration upstream of the selective reduction catalyst, detected ammonia concentration $NH3_{CONS}$, urea injection amount $G_{UREA}$, and NOx reduction rate in a case of urea injection control having been executed using the above such feed-forward controller of the present embodiment.

It should be noted that, in FIG. 13, the solid lines show control results of the present embodiment, and the dotted lines show control results in a case of urea injection control having been performed solely by the sliding-mode controller.

As shown in FIG. 13, when the load of the engine rises from time $t_1$ to $t_2$, the NOx concentration on an upstream side of the selective reduction catalyst rises accompanying this rise in load. Herein, when the load of the engine rises, the FF injection amount $G_{UREA\_FF}$, which was appropriately set in accordance with the increase in NOx, is calculated by the feed-forward controller, whereby the urea injection amount $G_{UREA}$ can be maintained at an ideal injection amount without lag occurring. With this, the NOx reduction rate can be maintained at a maximum value.

In addition, by maintaining the NOx reduction rate to be high in this way, it is possible to prevent large fluctuation in the urea injection amount $G_{UREA}$, as well as to protect against the occurrence of ammonia slip and a decline in the NOx reduction rate accompanying such a fluctuation.

Configuration of Storage Corrected Input Calculating Portion

Next, a detailed configuration of a storage corrected input calculating portion will be explained while referring to FIGS. 14 to 21.

As explained above, the first selective reduction catalyst and the second selective reduction catalyst have functions of storing ammonia. Three problems observed by the inventors of the present application when executing urea injection control with such selective reduction catalysts will be explained.

(4) Decline in NOx Reduction Rate During Unsaturation of Storage Amount

Figure 14:
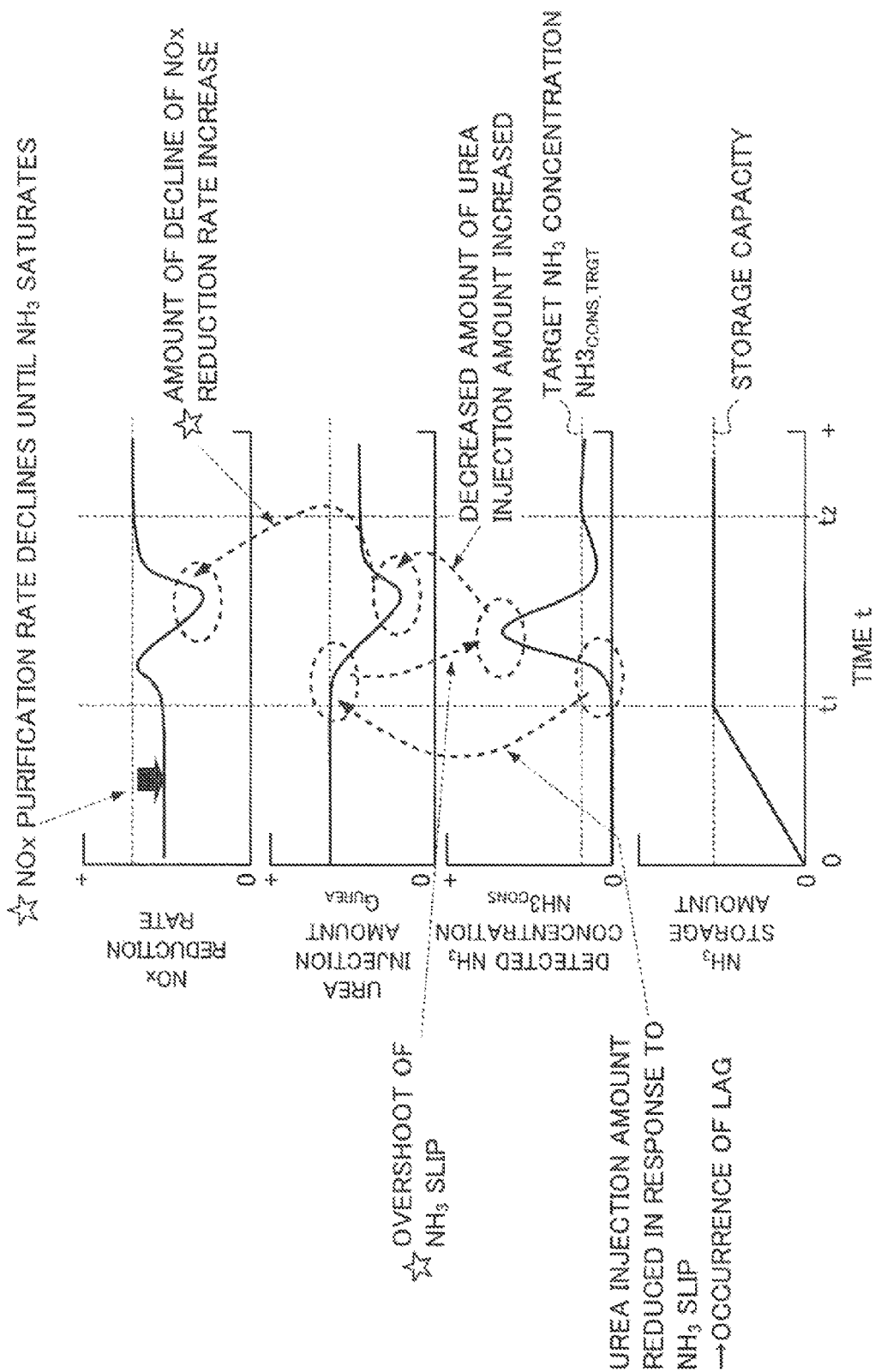
FIG. 14 shows relationships between the NOx reduction rate, urea injection amount, detected ammonia concentration, and ammonia storage amount in a case of urea injection control having been started from a state in which the ammonia stored in the selective reduction catalyst is not saturated.

FIG. 14 shows relationships between the NOx reduction rate, urea injection amount $G_{UREA}$, detected ammonia concentration $NH3_{CONS}$, and ammonia storage amount in a case of urea injection control having been started from a state of the ammonia stored in the selective reduction catalyst not being saturated, i.e. a state in which the storage amount in the selective reduction catalyst is less than the storage capacity thereof. With the example shown in FIG. 14, a case is shown in which urea injection control is initiated from a state in which the storage amount of ammonia is "0" at the time t=0, and the storage amount reaches the storage capacity at the time $t=t_1$.

As shown in FIG. 14, since the storage amount of ammonia is no more than the storage capacity between times t=0 to the NOx reduction rate of the selective reduction catalyst declines past the NOx reduction rate when saturated.

(5) Occurrence of Excessive Ammonia Slip Due to Decrease of Urea Injection Amount Lag As shown in FIG. 14, since the storage amount of ammonia is no more than the storage capacity between times t=0 to $t_1$, ammonia slip does not occur. As a result, between the times t=0 to $t_1$, the output value $NH3_{CONS}$ of the ammonia sensor is "0". In addition, during this time, the urea injection amount $G_{UREA}$ is set to a maximum value in order to by all possible means shorten the aforementioned such interval in which the NOx reduction rate has declined in response to the output value $NH3_{CONS}$ of the ammonia sensor being "0".

In this case, in response to the storage amount having reached the storage capacity at the time $t=t_1$, although control to decrease the urea injection amount $G_{UREA}$ is executed, time is required until the urea injection amount actually decreases, due to the detection lag of the ammonia sensor and lag caused by the urea injection amount decreasing from the maximum value. As a result, the detected ammonia concentration $NH3_{CONS}$ will greatly overshoot the target ammonia concentration $NH3_{CONS\_TRGT}$ thereof, and excessive ammonia slip will occur.

(6) Decline in NOx Reduction Rate Due to Occurrence of Excessive Ammonia Slip

In addition, when excessive ammonia slip occurs as explained above, it is necessary to further reduce the urea injection amount $G_{UREA}$ in order to suppress this ammonia slip. However, in this case, the NOx reduction rate will decline again.

In order to solve these three problems, it is necessary to execute urea injection control following a plan such as that exemplified below.

Specifically, in order to the solve the aforementioned problem (4), the interval is shortened in which the NOx reduction rate is reduced by increasing the amount of the urea injection amount $G_{UREA}$ until the storage amount of ammonia reaches the storage capacity. In addition, in order to solve problems (5) and (6), in addition to increasing the amount of the urea injection amount $G_{UREA}$ in the aforementioned way, the urea injection amount $G_{UREA}$ is reduced before ammonia saturates and ammonia slip occurs.

In order to realize urea injection control following such a plan, a first storage amount of a first selective reduction catalyst is estimated based on an ammonia storage model described later by the storage corrected input calculating portion, and a corrected injection amount $G_{UREA\_ST}$ of the urea injection amount $G_{UREA}$ is calculated so that the first storage amount $ST_{UREA\_FB}$ thus estimated quickly converges with a predetermined target storage amount $ST_{UREA\_TRGT}$ without overshooting.

In addition', herein, although the target storage amount $ST_{UREA\_TRGT}$ is set to the same value as a first storage capacity $ST_{UREA\_MAX1}$ of the first selective reduction catalyst by a setting portion that is not illustrated, it is not limited thereto. For example, in order to suppress the occurrence of excessive ammonia slip, the target storage amount $ST_{UREA\_TRGT}$ is in the vicinity of the first storage capacity $ST_{UREA\_MAX1}$, and may be set to a value that is smaller than this $ST_{UREA\_MAX1}$.

Figure 15:
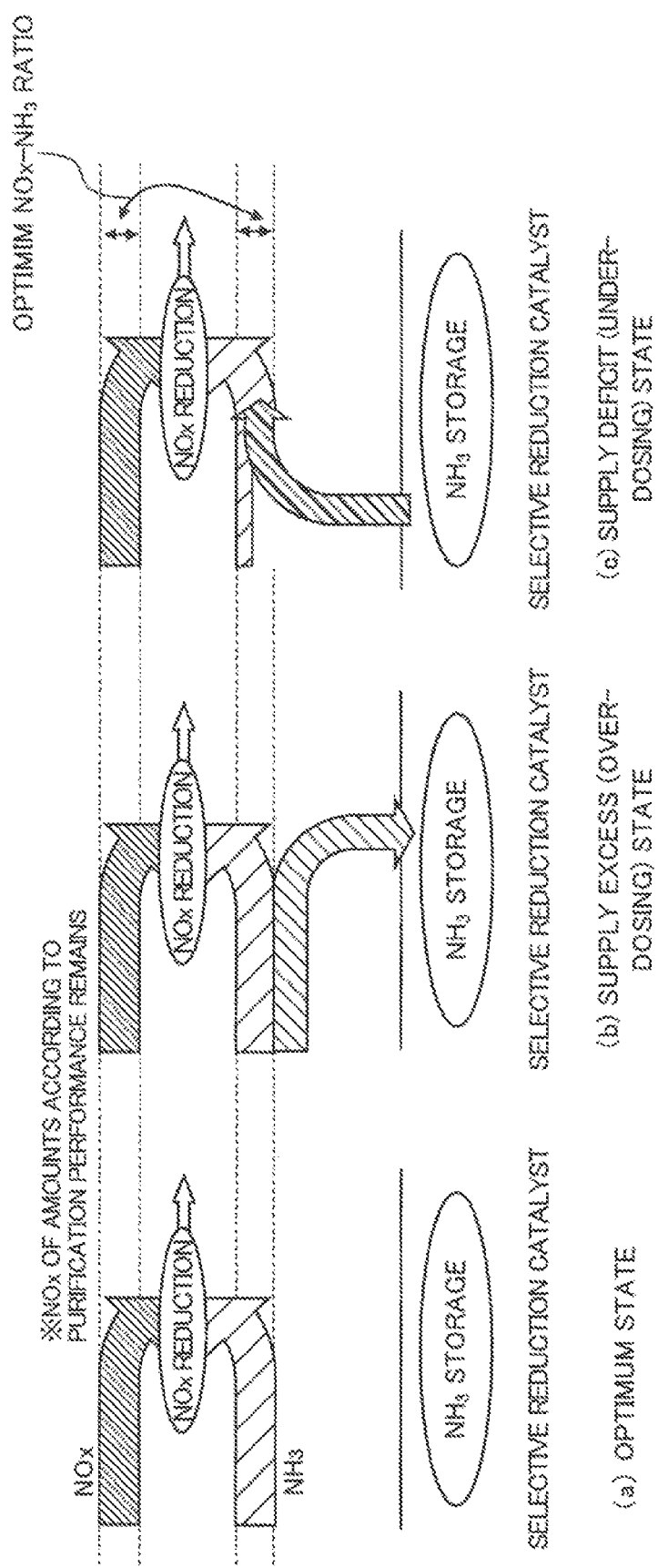
FIG. 15 is a schematic diagram showing the concept of an ammonia storage model of a storage corrected input calculating portion according to the embodiment.

FIG. 15 is a schematic diagram showing the concept of the ammonia storage model of the storage corrected input calculating portion.

This ammonia storage model is a model that estimates the change in the storage amount of ammonia in the selective reduction catalyst according to the urea injection amount relative to the NOx concentration of exhaust flowing into the selective reduction catalyst. More specifically, the states of change of the storage amount in the selective reduction catalyst are classified into the three states of a state in which the urea injection amount relative to a predetermined NOx concentration is ideal (refer to FIG. 15(a)), a state in which the urea injection amount is excessive (refer to FIG. 15(b)), and a state in which the urea injection amount is insufficient (refer to FIG. 15(c)).

As shown in FIG. 15(a), in a case of the state in which the urea injection amount relative to NOx flowing into the selective reduction catalyst is ideal, i.e. a case in which the amount of ammonia that can most efficiently reduce NOx in the exhaust and the amount of ammonia generated from the urea water supplied substantially match, there is no change in storage amount.

As shown in FIG. 15(b), in a case of the state in which the urea injection amount relative to NOx flowing into the selective reduction catalyst is excessive, i.e. a case in which the amount of ammonia generated from the urea water supplied is greater than the amount that can most efficiently reduce NOx in the exhaust, this surplus ammonia is stored in the selective reduction catalyst. Therefore, in such a supply excess (over-dosing) state, the storage amount increases.

As shown in FIG. 15(c), in a case of the state in which the urea injection amount relative to NOx flowing into the selective reduction catalyst is insufficient, i.e. in a case in which the amount of ammonia generated from the urea water supplied is less than the amount that can most efficiently reduce NOx in the exhaust, this deficit is compensated from the ammonia stored. Therefore, in such a supply deficit (under-dosing) state, the storage amount decreases.

Next, a configuration of the storage corrected input calculating portion that calculates the aforementioned corrected injection amount $G_{UREA\_ST}$ based on the above such storage model will be explained while referring to FIGS. 16 to 19. In addition, three forms will be explained below as specific configurations of such a storage corrected input calculating portion.

Figure 16:
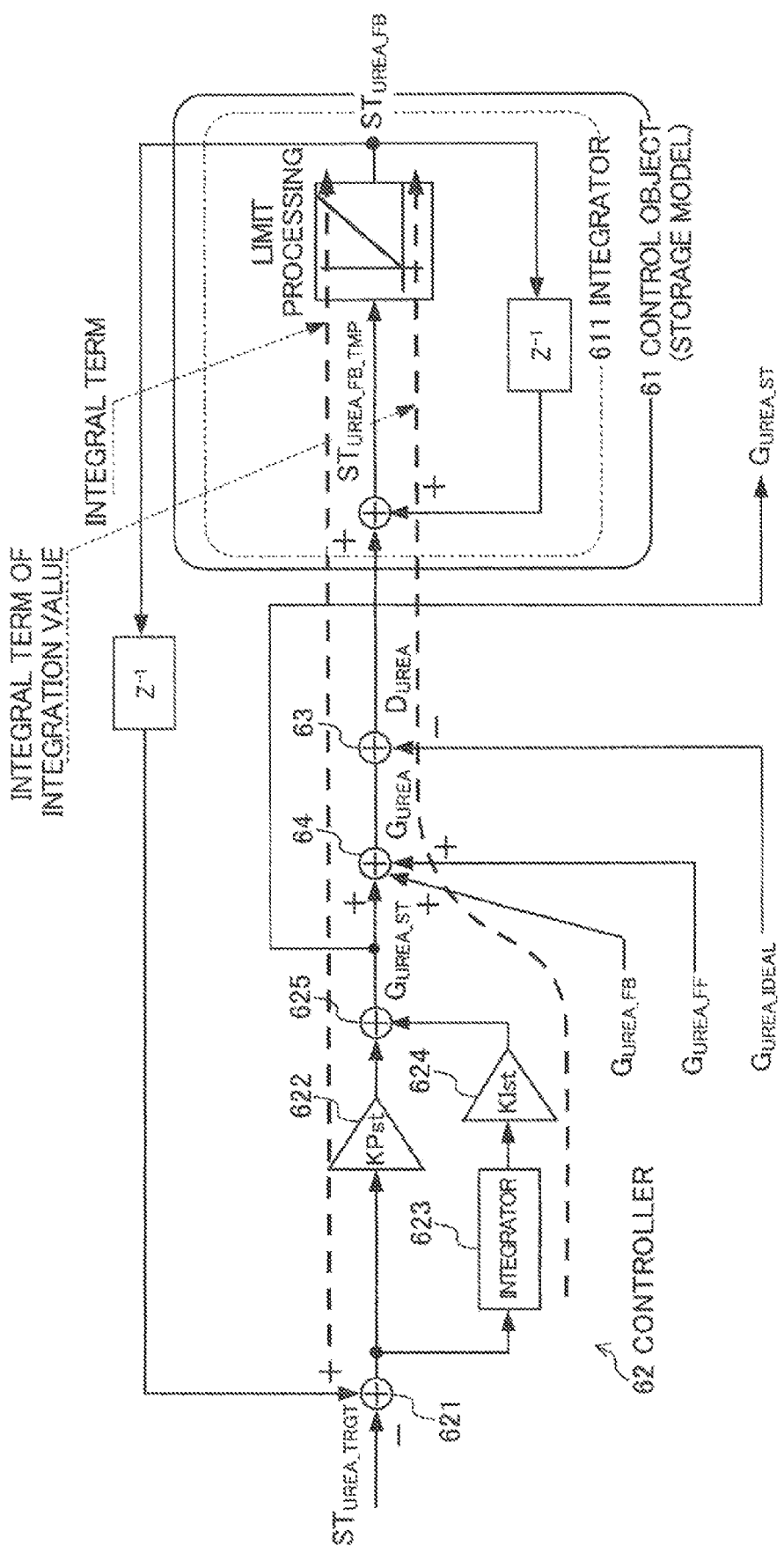
FIG. 16 is a block diagram showing a configuration of a first form of a storage correction input calculation portion according to the embodiment.

FIG. 16 is a block diagram showing a first form of the storage corrected input calculating portion.

This storage corrected input calculating portion is configured to include a control object 61 that is configured based on the aforementioned such ammonia storage model, and a controller 62 of this control object 61.

The control object 61 sets a surplus urea injection amount $D_{UREA}$ representing an amount of urea water that becomes surplus when reducing NOx in the exhaust as a control input, and sets a first storage amount $ST_{UREA\_FB}$ of the first selective reduction catalyst as a control output. More specifically, this control object 61 is configured by an integrator 611 that estimates the first storage amount $ST_{UREA\_FB}$ of the first selective reduction catalyst by successively adding the ammonia amount stored or successively subtracting the ammonia amount consumed, based on the surplus urea injection amount $D_{UREA}$.

First, a surplus urea injection amount $D_{UREA}(k)$ is calculated by way of an adder 63 by subtracting an ideal urea injection amount $G_{UREA\_IDEAL}$, which is a urea injection amount necessary to reduce NOx in the exhaust flowing into the first selective reduction catalyst, from the urea injection amount $G_{UREA}(k)$, as shown in the following formula (8). It should be noted that this urea injection amount $G_{UREA}(k)$ is calculated by way of an adder 64 by adding an FB injection amount $G_{UREA\_FB}(k)$ and FF injection amount $G_{UREA\_FF}(k)$ to the corrected injection amount $G_{UREA\_ST}(k)$ calculated by the controller 62.

$$D_{UREA}(k) = G_{UREA}(k) - G_{UREA\_IDEAL}(k) \qquad (8)$$

Herein, the ideal urea injection amount $G_{UREA\_IDEAL}(k)$ is calculated by multiplying the NOx concentration $NOX_{CONS}$ of exhaust flowing into the first selective reduction catalyst detected by the NOx sensor with a conversion factor $K_{CONV\_NOX\_UREA}$ that switches the injection amount necessary to reduce NOx, as shown in the following formula (9).

$$G_{UREA\_IDEAL}(k) = \qquad (9)$$
$$\begin{cases} K_{CONV\_NOX\_UREA} \; NOX_{CONS}(k) & \\ G_{UREA\_FF}(k) & \text{(in the case of no } NOx \text{ sensor)} \end{cases}$$

In addition, herein, in a case of there being no NOx sensor to detect the NOx concentration of exhaust flowing into the first selective reduction catalyst, the FF injection amount $G_{UREA\_FF}(k)$ may be set as the ideal urea injection amount $G_{UREA\_IDEAL}(k)$.

With the integrator 611, the first storage amount $ST_{UREA\_FB}(k)$ is estimated based on the surplus urea injection amount $D_{UREA}(k)$ fluctuating the first storage amount, by combining the integration operator relating to the time k of such a surplus urea injection amount $D_{UREA}(k)$ as shown in the following formula (10), with limit processing on such a first storage amount as shown in the following formula (11).

$$ST_{UREA\_FF\_TMP}(k) = ST_{UREA\_FB}(k-1) + D_{UREA}(k) \qquad (10)$$

$$ST_{UREA\_FB}(k) = \begin{cases} ST_{UREA\_FB\_TMP}(k) & (ST_{UREA\_FB\_TMP}(k) > 0) \\ 0 & (ST_{UREA\_FB\_TMP}(k) \leq 0) \end{cases} \qquad (11)$$

In particular, herein, the limit processing of the lower limit relative to the first storage amount $ST_{UREA\_FB}(k)$, i.e. processing such that $ST_{UREA\_FB}(k)$ becomes "0" at the minimum, is conducted with formula (11). In other words, the limit processing of the upper limit relative to the first storage amount $ST_{UREA\_FB}(k)$, i.e. processing such that $ST_{UREA\_FB}(k)$ becomes a first storage capacity $ST_{UREA\_MAX1}$ at the maximum, is not conducted with formula (11).

This is because the problem exemplified in the aforementioned (5) may not be able to be solved. In other words, it is because, in a case of the target first storage amount $ST_{UREA\_TRGT}$ being set to the same value as the first storage capacity $ST_{UREA\_MAX1}$ as explained above, if limit processing of the upper limit is performed, the first storage amount $ST_{UREA\_FB}$ will be limited to the first storage capacity $ST_{UREA\_MAX1}$ without reducing the urea injection amount $G_{UREA}$, and it will become difficult to perform control to suppress ammonia slip.

The controller 62 calculates the corrected injection amount $G_{UREA\_ST}(k)$ of the urea injection amount $G_{UREA}$ by PI control so that the first storage amount $ST_{UREA\_FB}(k)$ estimated converges with the target first storage amount $ST_{UREA\_TRGT}$.

With the controller 62, the target first storage amount $ST_{UREA\_TRGT}(k)$ is subtracted by way of an adder 621 from the first storage amount $ST_{UREA\_FB}$ estimated, as shown in the following formula (12), and this is defined as the first storage deviation $E_{ST}(k)$.

$$E_{ST}(k) = ST_{UREA\_FB}(k) - ST_{UREA\_TRGT}(k) \qquad (12)$$

Next, a proportional term $G_{UREA\_ST\_P}(k)$ is calculated by way of a multiplier 622 by multiplying the proportional gain $KP_{ST}$ by the first storage amount deviation $E_{ST}(k)$, as shown in the following formula (13).

$$G_{UREA\_ST\_P}(k) = KP_{ST} E_{ST}(k) \qquad (13)$$

In addition, an integral term $G_{UREA\_ST\_I}(k)$ is calculated by way of an integrator 623 and multiplier 624 by multiplying the integral gain $KI_{ST}$ by the time integration value of the first storage amount deviation $E_{ST}(k)$, as shown in the following formula (14).

$$G_{UREA\_ST\_I}(k) = KI_{ST} \sum_{i=0}^{k} E_{ST}(i) \quad (14)$$

Next, the sum of the proportional term $G_{UREA\_ST\_P}(k)$ and the integral term $G_{UREA\_ST\_I}(k)$ is calculated by an adder 625, and this is defined as the corrected injection amount $G_{UREA\_ST}(k)$, as shown in the following formula (15).

$$G_{UREA\_ST}(k) = G_{UREA\_ST\_P}(k) + G_{UREA\_ST\_I}(k) \quad (15)$$

Figure 17:
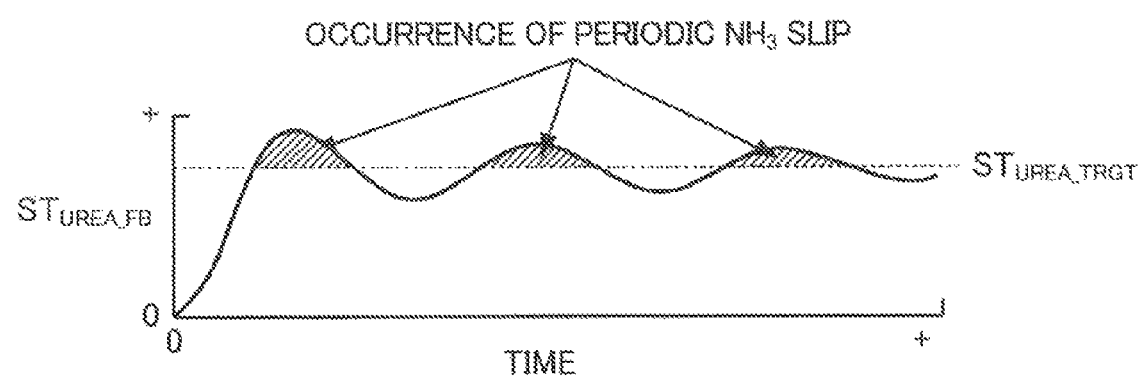
FIG. 17 is a graph showing the time change of a first storage amount estimated by the first form of the storage corrected input calculating portion according to the embodiment.

FIG. 17 is a graph showing the time change of the first storage amount $ST_{UREA\_FB}$ estimated by the first form of the above storage corrected input calculating portion.

As shown in FIG. 17, the first storage amount $ST_{UREA\_FB}$ shows oscillatory behavior relative to the target first storage amount $ST_{UREA\_TRGT}$, whereby ammonia slip periodically occurs.

This is because the control object 61 of the aforementioned storage model is a structure including the integrator 611. In other words, it is because, in this case, the proportional term $G_{UREA\_ST\_P}$ of the controller 62 becomes the integral term, and the integral term $G_{UREA\_ST\_I}$ becomes an integral term for an integral value, and the integral term $G_{UREA\_ST\_I}$ in particular exhibits oscillatory behavior.

Therefore, the second form and third form of the storage corrected input calculating portion that solve such problems will be explained hereinafter.

Figure 18:
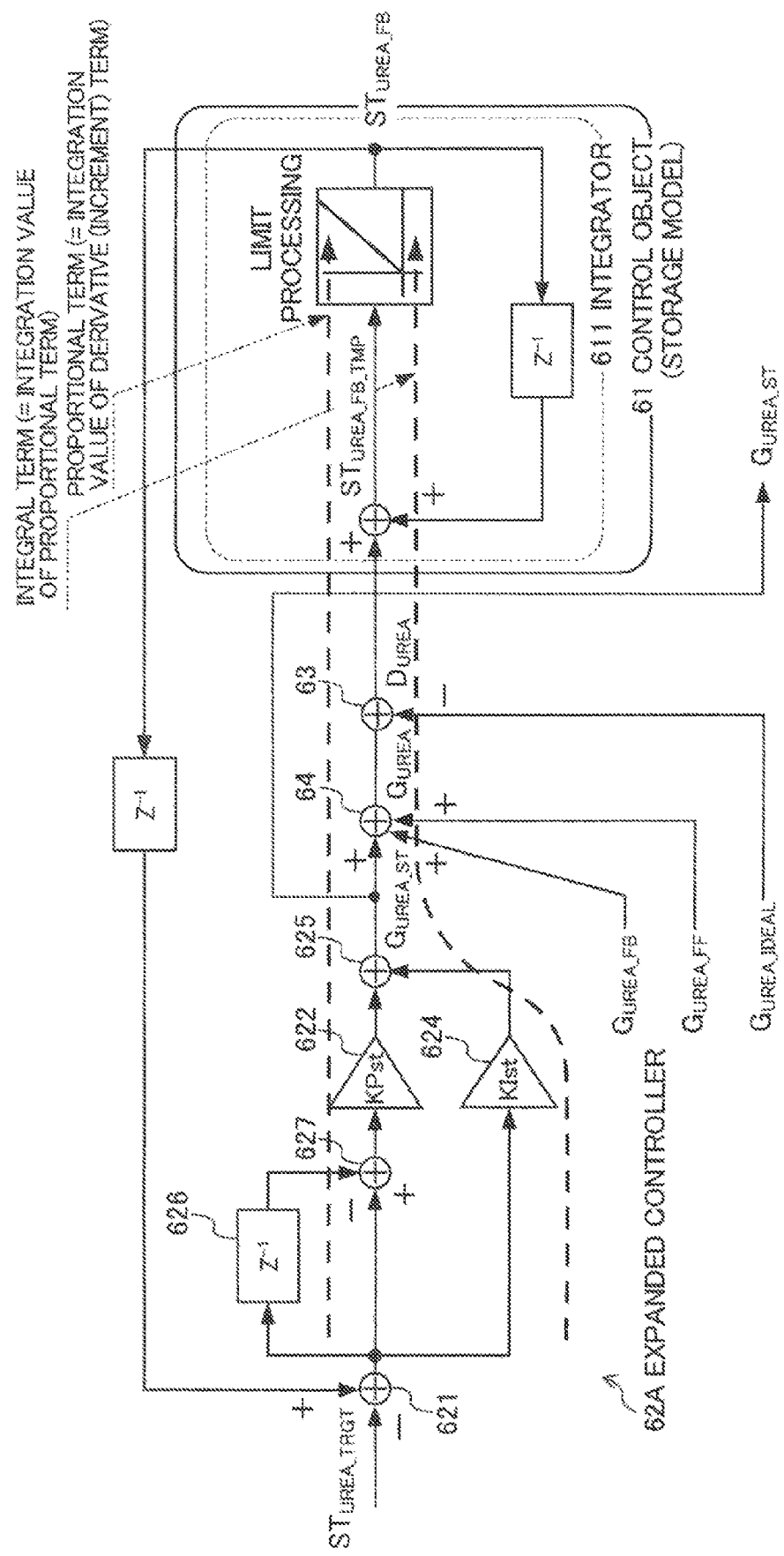
FIG. 18 is a block diagram showing a configuration of a second form of the storage correction input calculation portion according to the embodiment.

FIG. 18 is a block diagram showing a configuration of the second form of the storage corrected input calculating portion. This storage corrected input calculating portion of the second form has a configuration of a controller 62A that is different from the first form shown in FIG. 16 described above.

This controller 62A is a controller using expanded PI control in which the integrator 611 of the control object 61 is treated as a part of the controller, as explained in detail later.

With the controller 62A, the target first storage amount $ST_{UREA\_TRGT}(k)$ is subtracted by the adder 621 from the first storage amount $ST_{UREA\_FB}(k)$ estimated, and this is defined as the first storage amount deviation $E_{ST}(k)$, as shown in the following formula (16).

$$E_{ST}(k) = ST_{UREA\_FB}(k) - ST_{UREA\_TRGT}(k) \quad (16)$$

In addition, with this controller 62A, the integrator 611 of the control object 61 is treated as a part of the controller, and the proportional term $G_{UREA\_ST\_P}(k)$ and the integral term $G_{UREA\_ST\_I}(k)$ are calculated taking into account that each is integrated later, as shown in the following formulas (17) and (19).

More specifically, the derivative value $E_{ST}(k) - E_{ST}(k-1)$ of the first storage amount deviation is calculated by a delay computing unit 626 and an adder 627, and the product of the proportional gain $KP_{ST}$ multiplied by this derivative value by way of the multiplier 622 is defined as the proportional term $G_{UREA\_ST\_P}(k)$, as shown in the following formula (17).

In addition, the product of the integral gain $KI_{ST}$ being multiplied by the multiplier 624 by the first storage amount deviation $E_{ST}(k)$ is defined as the integral term $G_{UREA\_ST\_I}(k)$, as shown in the following formula (18).

$$G_{UREA\_ST\_P}(k) = KP_{ST}(E_{ST}(k) - E_{ST}(k-1)) \quad (17)$$

$$G_{UREA\_ST\_I}(k) = KI_{ST} E_{ST}(k) \quad (18)$$

Next, the sum of the proportional term $G_{UREA\_ST\_P}(k)$ and the integral term $G_{UREA\_ST\_I}(k)$ is calculated by the adder 625 as shown in the following formula (15), and this is defined as the corrected injection amount $G_{UREA\_ST}(k)$.

$$G_{UREA\_ST}(k) = G_{UREA\_ST\_P}(k) G_{UREA\_ST\_I}(k) \quad (19)$$

Figure 19:
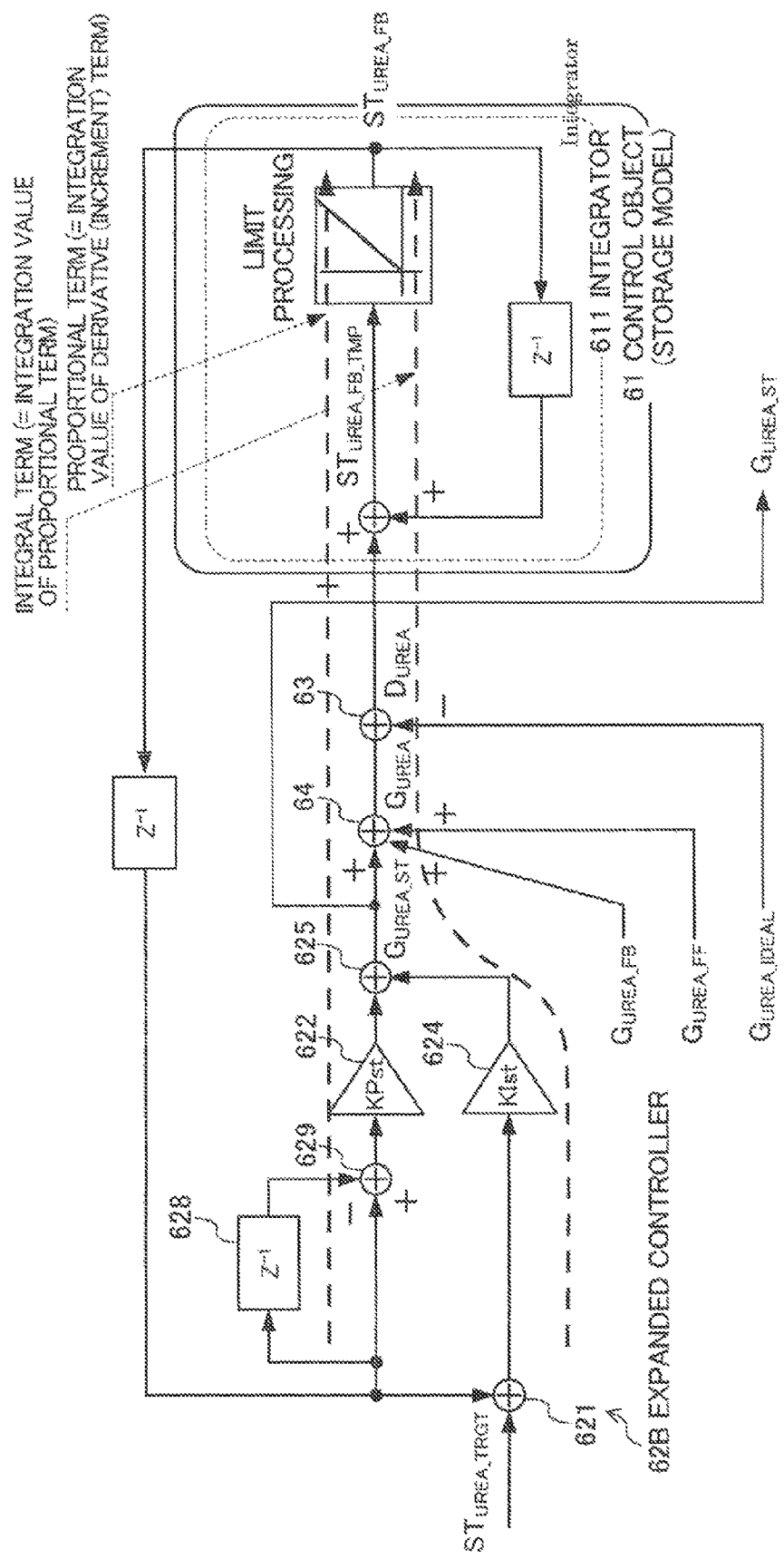
FIG. 19 is a block diagram showing a configuration of a third form of the storage corrected input calculating portion according to the embodiment.

FIG. 19 is a block diagram showing a configuration of the third form of the storage corrected input calculating portion. This storage corrected input calculating portion of the third form has a configuration of a controller 62B that is different from the second form shown in the aforementioned FIG. 18.

This controller 62B is a controller in which the integrator 611 of the control object 61 is treated as a part of the controller similarly to the aforementioned controller 62A, and uses expanded I-P control giving the first storage value deviation $E_{ST}(k)$ only to the integral term.

With the controller 62B, the target first storage amount $ST_{UREA\_TRGT}(k)$ is subtracted by the adder 621 from the first storage amount $ST_{UREA\_FB}$ estimated, as shown in the following formula (20), and this is defined as the first storage amount deviation $E_{ST}(k)$.

$$E_{ST}(k) = ST_{UREA\_FB}(k) - ST_{UREA\_TRGT}(k) \quad (20)$$

Next, the product of multiplying the integral gain $KI_{ST}$ by the first storage amount deviation $E_{ST}(k)$ by way of the multiplier 624 is defined as the integral term $G_{UREA\_ST\_I}(k)$, as shown in the following formula (21).

$$G_{UREA\_ST\_I}(k) = KI_{ST} E_{ST}(k) \quad (21)$$

On the other hand, the derivative value of the first storage amount $ST_{UREA\_FB}(k) - ST_{UREA\_FB}(k-1)$ is calculated by a delay computing unit 268 and an adder 629, and the product of multiplying the proportional gain $KP_{ST}$ by this derivative value by way of the multiplier 622 is defined as the proportional term $G_{UREA\_ST\_?}(k)$, as shown in the following formula (22).

$$G_{UREA\_ST\_P}(k) = KP_{ST}(ST_{UREA\_FB}(k) - ST_{UREA\_FB}(k-1)) \quad (22)$$

Next, as shown in the following formula (23), the sum of the proportional term $G_{UREA\_ST\_P}(k)$ and the integral term $G_{UREA\_ST\_I}(k)$ is calculated by the adder 625, and this is defined as the corrected injection amount $G_{UREA\_ST}(k)$.

$$G_{UREA\_ST}(k) = G_{UREA\_ST\_P}(k) + G_{UREA\_ST\_I}(k) \quad (23)$$

Figure 20:
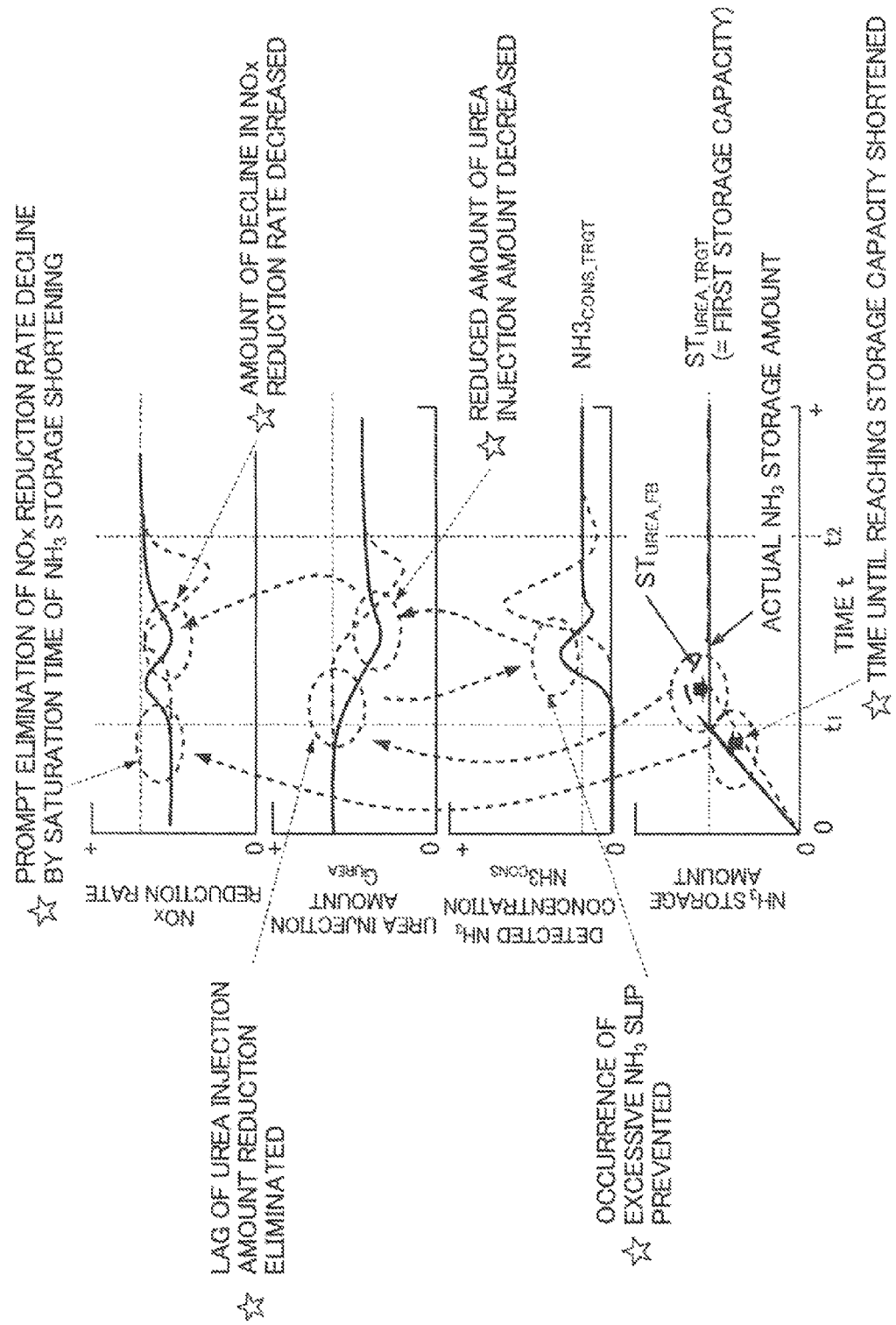
FIG. 20 shows relationships between the NOx reduction rate, urea injection amount, detected ammonia concentration, and ammonia storage amount in a case of urea injection control having been executed using the storage corrected input calculating portion according to the embodiment.

FIG. 20 shows relationships between the NOx reduction rate, urea injection amount $G_{UREA}$, detected ammonia concentration $NH3_{CONS}$, and ammonia storage amount in a case of urea injection control having been executed using the above such storage corrected input calculating portion. In the example shown in FIG. 20, a case is shown in which urea injection control is initiated from a state in which the storage amount of ammonia is "0" at the time t=0, and the storage amount reaches the storage capacity at the time $t=t_1$.

It should be noted that, in FIG. 20, the solid lines show control results of the present embodiment, and the dotted lines show control results in a case of urea injection control having been performed without predicting the first storage amount.

According to the present embodiment, the time until the first storage amount reaches the first storage capacity can be shortened by estimating the first storage amount $ST_{UREA\_FB}$ and performing feed-back control so that this first storage amount $ST_{UREA\_FB}$, converges with a target first storage amount $ST_{UREA\_TRGT}$. With this, the time until ammonia saturates the first selective reduction catalyst can be shortened, whereby the NOx reduction rate can be quickly raised.

In addition, a decrease in the urea injection amount $G_{UREA}$ can be initiated prior to the ammonia actually saturating the first selective reduction catalyst, by estimating the first storage amount $ST_{UREA\_FB}$ and performing feed-back control so that this first storage amount $ST_{UREA\_FB}$ converges with the target first storage amount $ST_{UREA\_TRGT}$. In other words, the lag in the decrease in the urea injection amount can be eliminated. With this, it is possible to prevent the occurrence of excessive ammonia slip.

In addition, by preventing such an occurrence of excessive ammonia slip, it is possible to reduce the decreased amount of the urea injection amount, which is the object of controlling this ammonia slip. With this, it is possible to prevent a decline in the NOx reduction rate.

Figure 21:
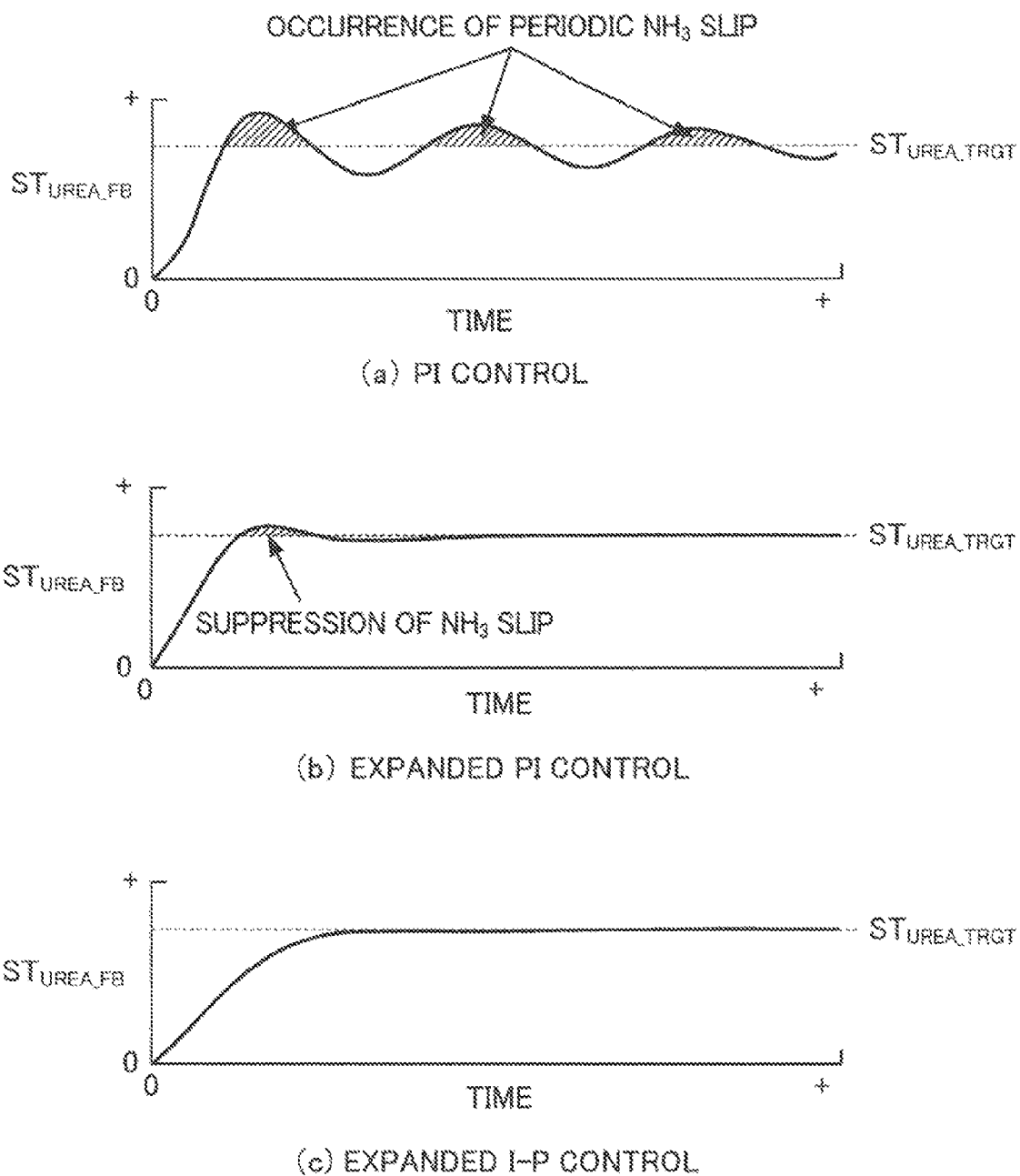
FIG. 21 shows the time change of a first storage amount estimated by the storage corrected input calculating portion according to the embodiment.

FIG. 21 shows the time change of a first storage amount $ST_{UREA\_FB}$ estimated by the above such storage corrected input calculating portion. FIG. 21(a) shows the control result according to the first form using PI control, FIG. 21(b) shows the control result according to the second form using expanded PI control, and FIG. 21(c) shows the control result according to the third form using expanded I-P control.

As shown in FIG. 21(b), in a case of using expanded PI control, the periodic oscillation of the first storage amount $ST_{UREA\_FB}$ generated in a case of using PI control is eliminated, and quickly converges with the target first storage amount $ST_{UREA\_TRGT}$. In addition, the occurrence of periodic ammonia slip is also suppressed by this.

As shown in FIG. 21(c), in a case of using expanded I-P control, the periodic oscillation of the first storage amount $ST_{UREA\_FB}$ is further eliminated compared to a case of using the aforementioned expanded PI control, whereby the occurrence of ammonia slip can be further suppressed.

This is because, as shown in the above formula (22), the proportional term $G_{UREA\_ST\_P}$ is calculated based on the first storage amount $ST_{UREA\_FB}$ and not the first storage amount deviation $E_{ST}$. In this case, the proportional term $G_{UREA\_ST\_P}$ does not operate so that the first storage amount deviation $E_{ST}$ becomes "0", but operates so that $ST_{UREA\_FB}$ becomes "0", whereby overshoot of $ST_{UREA\_FB}$ is suppressed.

However, when comparing a case of using expanded I-P control with a case of using expanded PI control, in the case of expanded I-P control, the above such overshoot is suppressed; however, the time until the first storage amount $ST_{UREA\_FB}$ reaches the target first storage amount $ST_{UREA\_TRGT}$ lengthens. As a result, it is preferable for either use of expanded I-P control or use of expanded PI control to be applied according to the configuration of the exhaust purification apparatus.

Configuration of Target Ammonia Concentration Setting Portion

Next, a detailed configuration of the target ammonia concentration setting portion will be explained while referring to FIGS. 22 to 27.

As explained above, the first storage capacity of the first selective reduction catalyst and the second storage capacity of the second selective reduction catalyst change according to the temperature of each. Problems observed by the inventors of the present application when executing urea injection control on such a selective reduction catalyst will be explained.

(7) Occurrence of Ammonia Slip of Second Selective Reduction Catalyst

Figure 22:
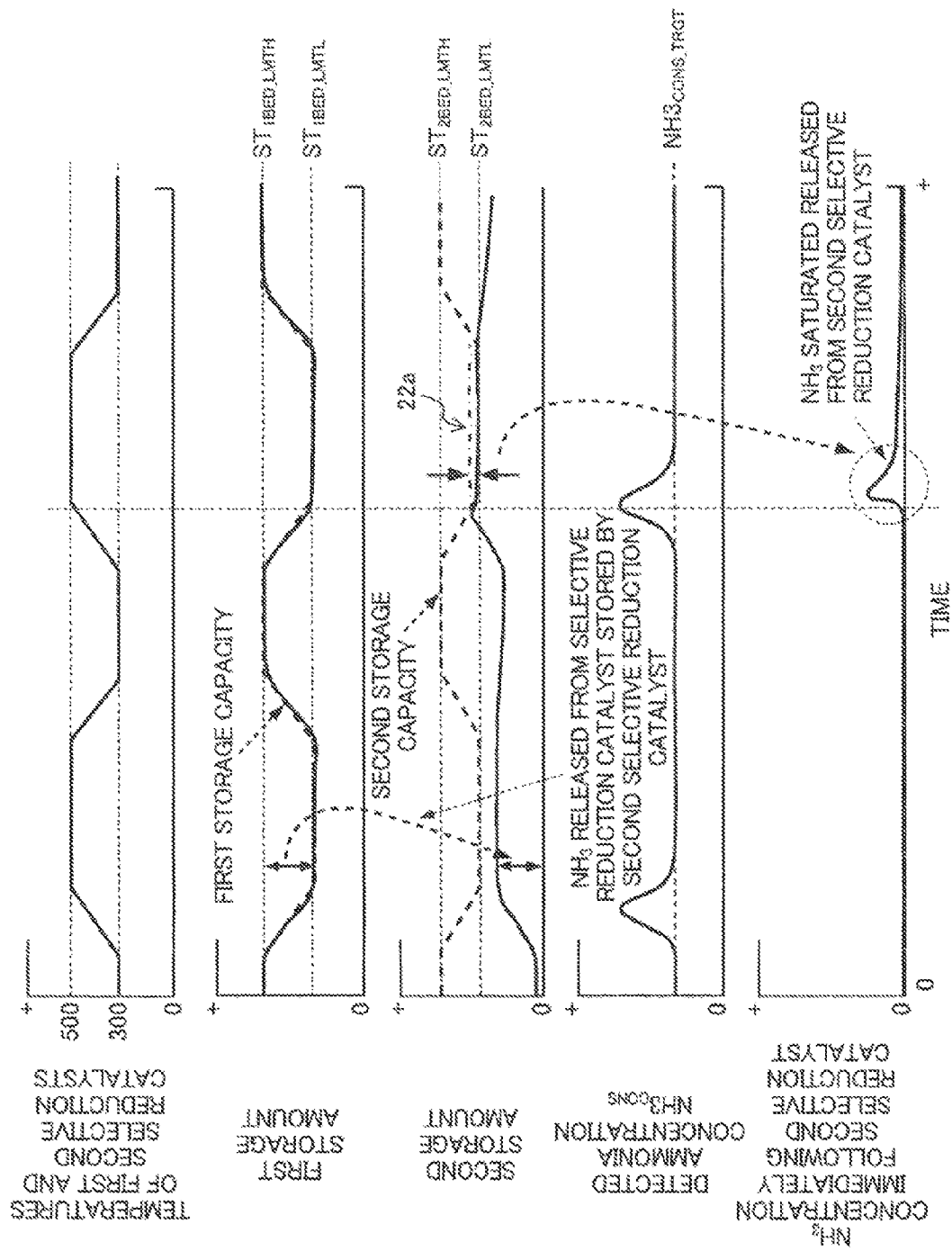
FIG. 22 shows relationships between the temperatures of a first and second selective reduction catalyst, first and second storage amounts, detected ammonia concentration, and ammonia concentration immediately following the second selective reduction catalyst in a case of urea injection control having been performed under a fixed target ammonia concentration.

FIG. 22 shows relationships between the temperatures of a first and second selective reduction catalysts, first and second storage amounts, detected ammonia concentration $NH3_{CONS}$ (ammonia concentration immediately following the first selective reduction catalyst), and ammonia concentration immediately following the second selective reduction catalyst in a case of urea injection control having been performed under a fixed target ammonia concentration $NH3_{CONS\_TRGT}$.

As shown in FIG. 22, the temperatures of the first and second selective reduction catalysts change greatly in response to a change in the operating state of the engine. In the example shown in FIG. 22, the temperatures of the first and second selective reduction catalysts, for which the upper limit and lower limit temperatures are respectively set as 500° C. and 300° C., change within this range. For example, in a case of the revolution speed and load of the engine increasing, and in a case of processing to temporarily raise the exhaust temperature during DPF regeneration being executed, the temperature of each selective reduction catalyst rises.

Along with such a change in catalyst temperature, the first storage capacity, for which the upper limit and lower limit capacities are respectively set to $ST_{1BED\_LMTH}$ and $ST_{1BED\_LMTL}$, and the second storage capacity, for which the upper limit and lower limit capacities are respective set to $ST_{2BED\_LMTH}$ and $ST_{2BED\_LMTL}$ change within these ranges. As a result, when the catalyst temperature rises, ammonia of the variable part of the first storage capacity is released to downstream thereof, and is stored in the second selective reduction catalyst.

However, since the second selective reduction catalyst is downstream of the first selective reduction catalyst, it is difficult for the ammonia thus stored to be consumed in the reduction of NOx, compared to the first selective reduction catalyst. As a result, once the second storage amount increases, time is required until this increased part is consumed. Therefore, if the catalyst temperature frequently rises and falls, ammonia will accumulate in the second selective reduction catalyst each time, and as shown by the arrow 22a in FIG. 22, the ammonia from the second selective reduction catalyst will saturate, and excessive ammonia slip of the second selective reduction catalyst may occur.

Taking into account the above such problem, in the present embodiment, the second storage amount of the second selective reduction catalyst is estimated, and the target ammonia concentration $NH3_{CONS\_TRGT}$ is set based on the second storage amount $NH3_{2BED\_ST}$ thus estimated by the target ammonia concentration setting portion. Specific operations of such a target ammonia concentration setting portion will be explained below.

With the target ammonia concentration setting portion, first, the NOx concentration detected by the NOx sensor (hereinafter referred to as "detected NOx concentration") $NOX_{CONS}(k)$ is defined as the NOx concentration of exhaust on an upstream side of the first selective reduction catalyst (hereinafter referred to as "first upstream NOx concentration") $NOX_{IN}(k)$, as shown in the following formula (24).

$$NOX_{IN}(k) = \begin{cases} NOX_{CONS}(k) \\ \text{map search based on } NE, TRQ \text{ (in a case of no } NOx \text{ sensor)} \end{cases} \quad (24)$$

Herein, in a case of there being no NOx sensor when determining the first upstream NOx concentration $NOX_{IN}(k)$, for example, it may be determined by way of a map search based on the revolution speed NE and load parameter TRQ of the engine.

Figure 23:
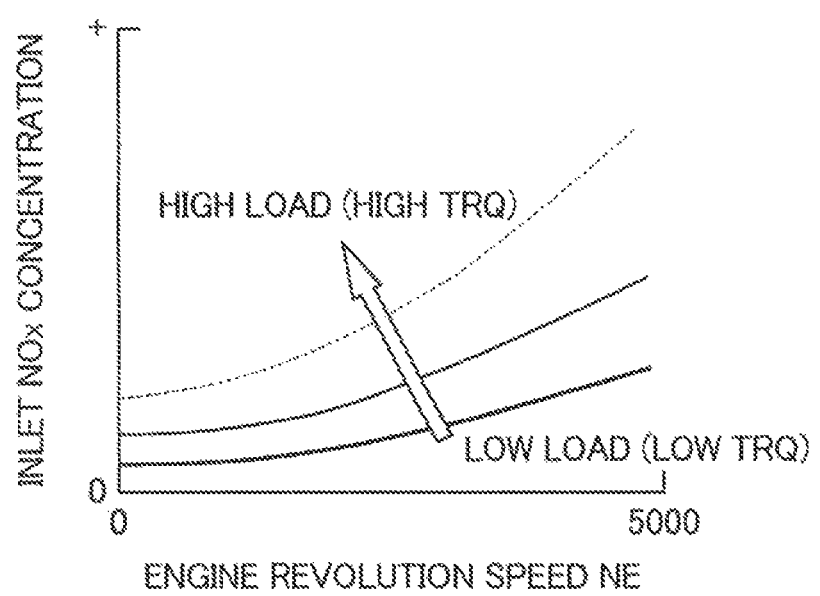
FIG. 23 is a graph showing an example of a search map of a first upstream NOx concentration according to the embodiment.

FIG. 23 is a graph showing an example of a search map of the first upstream NOx concentration $NOX_{IN}$.

As shown in FIG. 23, the first upstream NOx concentration $NOX_{IN}$ rises accompanying an increase in the revolution speed NE of the engine or in the load parameter TRQ of the engine.

Next, the NOx reduction rate $R_{NOX}(k)$ of the first selective reduction catalyst is calculated from the product of a reference NOx reduction rate $R_{NOX\_BS}(k)$ and a reduction rate correction factor $K_{RNOX}(k)$, as shown in the following formula (25).

$$R_{NOX}(k)=R_{NOX\_BS}(k)K_{RNOX}(k) \quad (25)$$

In this formula (25), the reference NOx reduction rate $R_{NOX\_BS}(k)$ and the correction factor $K_{RNOX}(k)$ are determined by way of a map search based on the revolution speed NE of the engine, load parameter TRQ, and detected ammonia concentration $NH3_{CONS}$.

Figure 24:
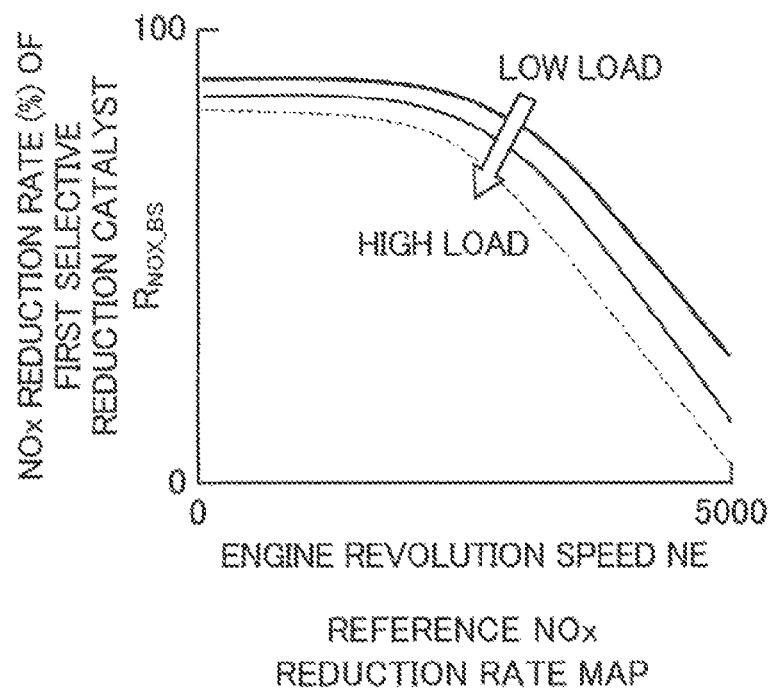
FIG. 24 is a graph showing an example of a search map of a reference NOx reduction rate according to the embodiment.

FIG. 24 is a graph showing an example of a search map of the reference NOx reduction rate $R_{NOX\_BS}$.

As shown in FIG. 24, the reference NOx reduction rate $R_{NOX\_BS}$ is determined based on the revolution speed NE and load parameter TRQ of the engine. The NOx concentration of exhaust flowing into the first selective reduction catalyst becomes higher accompanying the revolution speed NE and load parameter TRQ of the engine increasing. As a result, the NOx reduction rate of the first selective reduction catalyst becomes lower accompanying the revolution speed NE and load parameter TRQ increasing.

Figure 25:
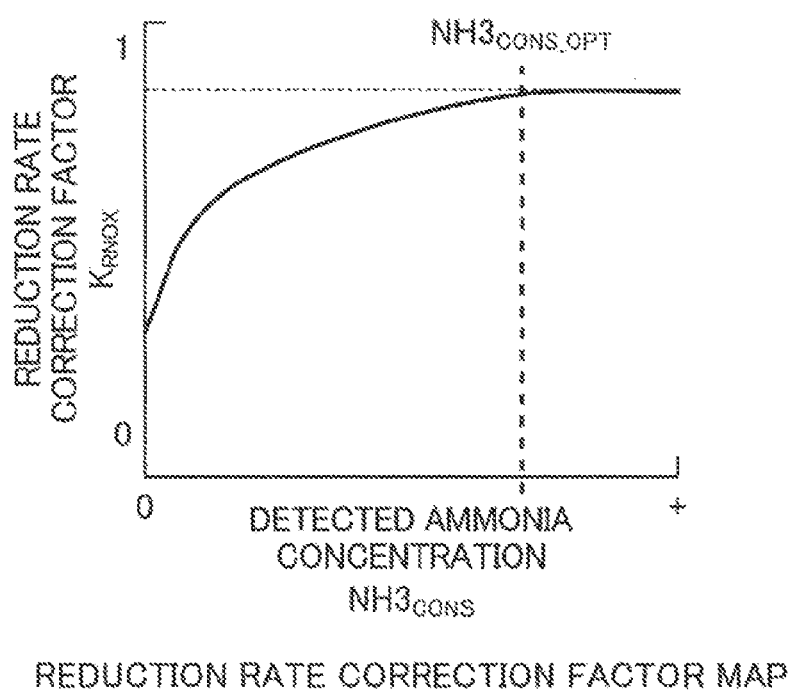
FIG. 25 is a graph showing an example of a search map of a reduction rate correction factor according to the embodiment.

FIG. 25 is a graph showing an example of a search map of the reduction rate correction factor $K_{RNOX}$.

As shown in FIG. 25, the reduction rate correction factor $K_{RNOX}$ becomes larger and asymptotically approaches "1", accompanying the detected ammonia concentration $NH3_{CONS}$ becoming larger. This reduction rate correction factor $K_{RNOX}$ is a factor that corrects the NOx reduction rate according to the amount of ammonia slipping from the first selective reduction catalyst.

In addition, $NH3_{CONS\_OPT}$ in FIG. 25 will be explained in detail later while referring to FIG. 26.

Next, the NOx concentration of exhaust that could not be reduced by the first selective reduction catalyst and discharged to a downstream side thereof (hereinafter referred to as "first downstream NOx concentration") $NOX_{MID}$ is calculated based on the first upstream NOx concentration $NOX_{IN}$ and the NOx reduction rate $R_{NOX}(k)$, as shown in the following formula (26).

$$NOX_{MID}(k)=NOX_{IN}(k)(1-R_{NOX}(k)) \quad (26)$$

Next, the ammonia amount required to reduce NOx on a downstream side of the first selective reduction catalyst (hereinafter referred to as "required ammonia amount") $NH3_{RED\_MID}(k)$ is calculated from the product of the first downstream NOx concentration $NOX_{MID}$ and the conversion factor $K_{CONV\_NOX\_NH3}$, as shown in the following formula (27). Herein, the conversion factor $K_{CONV\_NOX\_NH3}$ is set to "1", for example.

$$NH3_{RED\_MID}(k)=K_{CONV\_NOX\_NH3}NOX_{MID}(k) \quad (27)$$

Next, based on the difference between the detected ammonia concentration $NH3_{CONS}(k)$ and the required ammonia amount $NH3_{RED\_MED}(k)$ fluctuating the second storage amount, the second storage amount $NH3_{2BED\_ST}(k)$ is estimated by combining the integral operator relating to the time k of the difference $NH3_{CONS}(k)-NH3_{RED\_MID}$ shown in the following formula (28) with the limit processing on the upper limit and lower limit of the second storage amount as shown in the following formula (29). In addition, in the formula (29), $NH3_{2BED\_ST\_MAX}$ is the second storage capacity of the second selective reduction catalyst, and becomes the upper limit of the second storage amount $NH3_{2BED\_ST}$ thus estimated.

$$NH3_{2BED\_ST\_TMP}(k)=NH3_{2BED\_ST}(k-1)+NH3_{CONS}(k)-NH3_{RED\_MID}(k) \quad (28)$$

$$NH3_{2BED\_ST}(k) = \begin{cases} NH3_{2BED\_ST\_MAX} & (NH3_{2BED\_ST\_MAX} \leq NH3_{2BED\_ST\_TMP}(k)) \\ NH3_{2BED\_ST\_TMP}(k) & (0 < NH3_{2BED\_ST\_TMP}(k) < NH3_{2BED\_ST\_MAX}) \\ 0 & (NH3_{2BED\_ST\_TMP}(k) \leq 0) \end{cases} \quad (29)$$

Next, the target ammonia concentration $NH3_{CONS\_TRGT}(k)$ is set by way of a map search, for example, based on the second storage amount $NH3_{2BED\_ST}(k)$ calculated with the formula (29).

Figure 26:
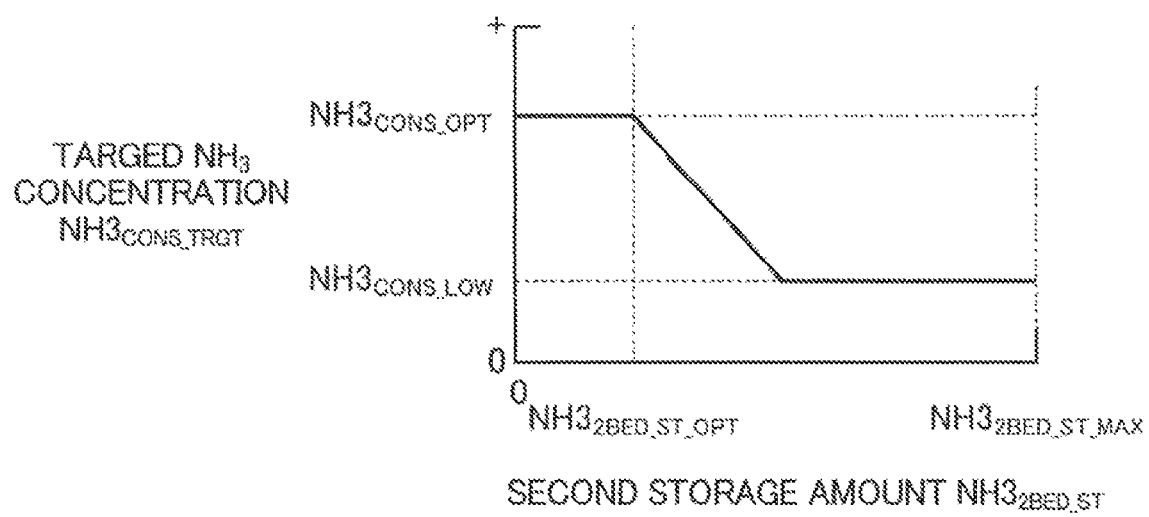
FIG. 26 is a graph showing an example of a search map of a target ammonia concentration according to the embodiment.

FIG. 26 is a graph showing an example of a search map of the target ammonia concentration $NH3_{CONS\_TRGT}$. In FIG. 26, the horizontal axis indicates the second storage amount $NH3_{2BED\_ST}$, and the vertical axis indicates the target ammonia concentration $NH3_{CONS\_TRGT}$.

According to this search map, the target ammonia concentration $NH3_{CONS\_TRGT}$ is set so as to be fixed or become smaller accompanying the second storage amount $NH3_{2BED\_ST}$ becoming larger.

As shown in FIG. 26, the target ammonia concentration $NH3_{CONS\_TRGT}$ is set to a value larger than "0" between $NH3_{CONS\_LOW}$ and $NH3_{CONS\_OPT}$.

More specifically, in a case of the second storage amount $NH3_{2BED\_ST}$ being larger than "0" and no more than a predetermined $NH3_{2BED\_ST\_OPT}$, the target ammonia concentration $NH3_{CONS\_TRGT}$ is set to $NH3_{CONS\_OPT}$.

In a case of the second storage amount $NH3_{2BED\_ST}$ being larger than the predetermined $NH3_{2BED\_ST\_OPT}$ and no more than the second storage capacity $NH3_{2BED\_ST\_MAX}$, the target ammonia concentration $NH3_{CONS\_TRGT}$ is set so as to asymptotically decrease from $NH3_{CONS\_OPT}$ toward $NH3_{CONS\_LOW}$ accompanying the second storage amount $NH3_{2BED\_ST}$ becoming larger.

Herein, $NH3_{CONS\_OPT}$ indicates an output value of the ammonia sensor that can efficiently reduce NOx while making the amount of ammonia slipping in the first selective reduction catalyst the minimum, as shown in the aforementioned FIG. 25. This optimum target concentration. $NH3_{CONS\_OPT}$ is set by experimentation according to the individual configuration of the exhaust purification apparatus.

$NH3_{CONS\_LOW}$ is set to a value lower than the optimum target concentration $NH3_{CONS\_OPT}$, and larger than "0".

$NH3_{2BED\_ST\_OPT}$ is set to a value such that ammonia slip of the second selective reduction catalyst can be prevented. More specifically, in a case of the ammonia stored in the first selective reduction catalyst being released, the difference between $NH3_{2BED\_ST\_MAX}$ and $NH3_{2BED\_ST\_OPT}$ is set so as to be larger than that ammonia amount that can be released from the first selective reduction catalyst, so that this ammonia can be stored in the second selective reduction catalyst.

Figure 27:
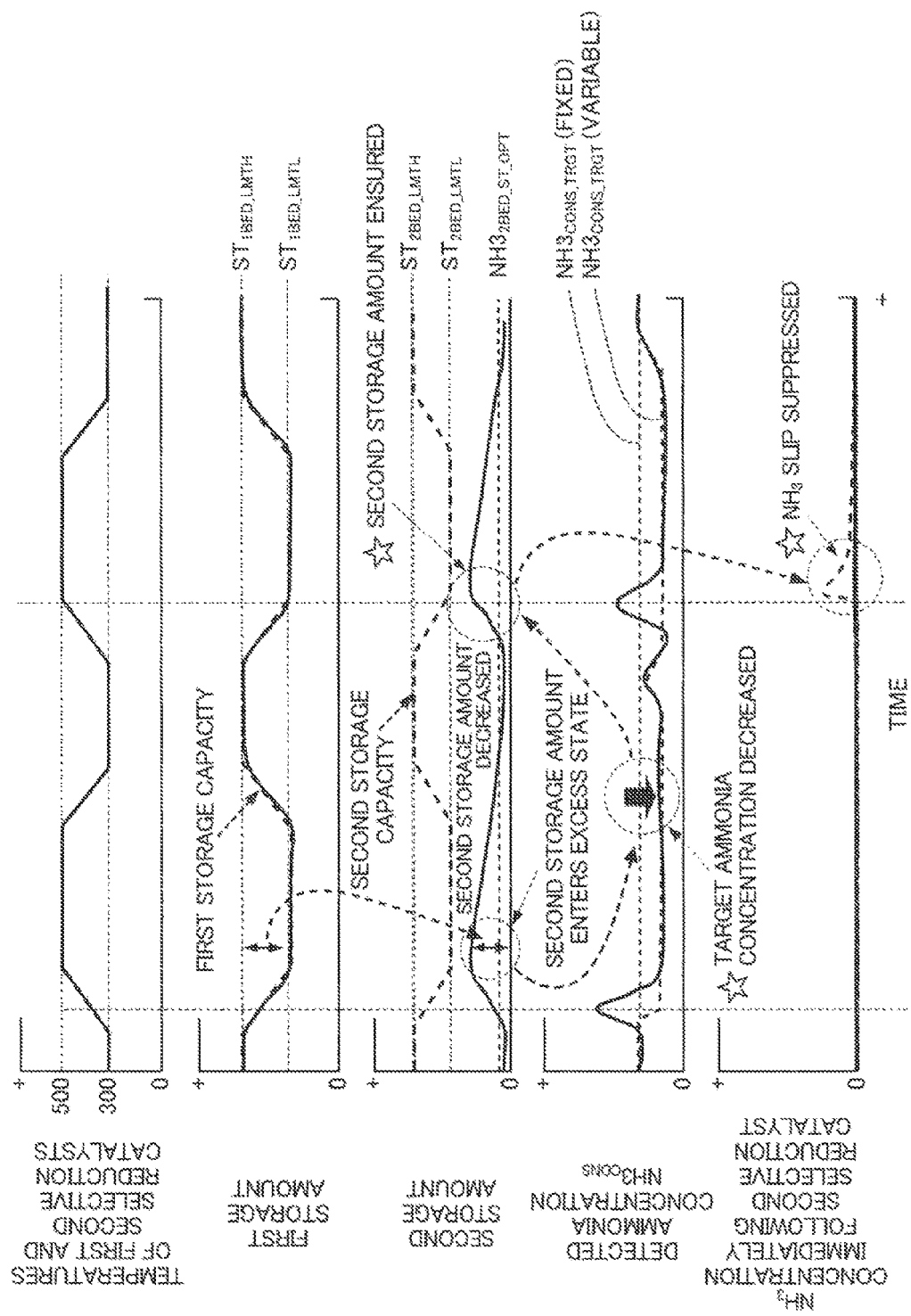
FIG. 27 shows relationships between temperatures of the first and second selective reduction catalysts, first and second storage amounts, detected ammonia concentration, and ammonia concentration immediately following the second selective reduction catalyst in a case of urea injection control having been executed using the target ammonia concentration setting portion according to the embodiment.
Figure 28:
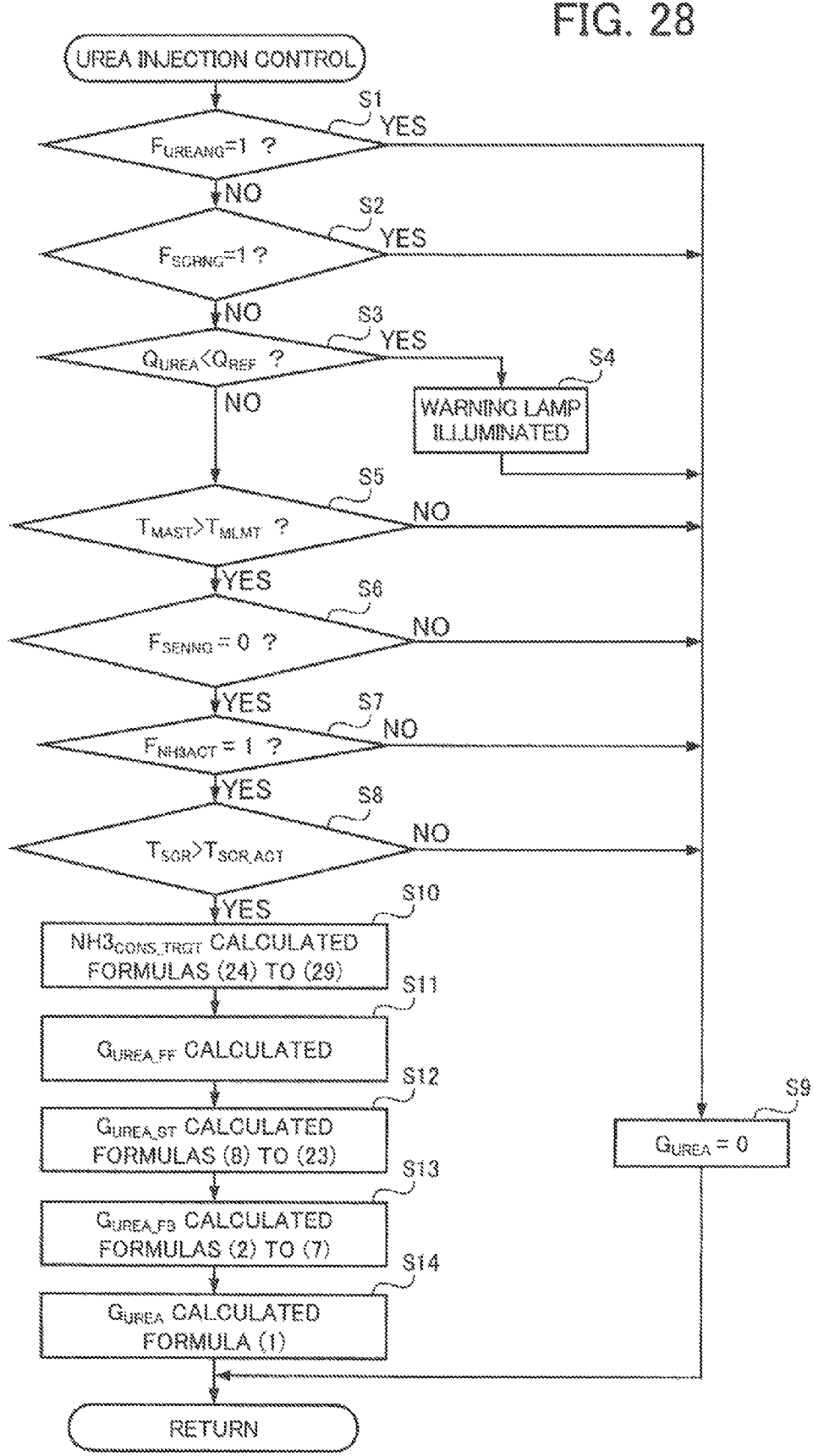
FIG. 28 is a flowchart showing a sequence of urea injection control processing that is executed by an ECU according to the embodiment.

FIG. 27 shows relationships between the temperatures of the first and second selective reduction catalysts, first and second storage amounts, detected ammonia concentration $NH3_{CONS}$ (ammonia concentration immediately following the first selective reduction catalyst), and ammonia concentration immediately following the second selective reduction catalyst in a case of urea injection control having been executed using the above such target ammonia concentration setting portion.

In addition, in the example shown in this FIG. 27, a case is shown in which the first storage capacity changes within the range of $ST_{1BED\_LMTH}$ and $ST_{1BED\_LMTL}$, and the second storage capacity changes within the range $ST_{2BED\_LMTH}$ and $ST_{2BED\_LMTL}$ accompanying changes in the temperatures of the first and second selective reduction catalysts.

As shown in FIG. 27, according to the present embodiment, the following operations are performed in a case of the first selective reduction catalyst suddenly rising in temperature, a large amount of ammonia being released from this first selective reduction catalyst, this ammonia being stored in the second selective reduction catalyst, and the second storage amount having entered an excess state.

In other words, in response to the second storage amount $NH3_{2BED\_ST}$ estimated having exceeded the aforementioned $NH3_{2BED\_ST\_OPT}$ (refer to FIG. 26), the target ammonia concentration $NH3_{CONS\_TRGT}$ decreases. With this, the ammonia concentration of exhaust flowing into the second selective reduction catalyst decreases, the second storage amount gradually declines, whereby a storage amount that can be stored in the second selective reduction catalyst can be ensured in preparation for a case in which a large amount of ammonia is released from the first selective reduction catalyst.

With this, it is possible to prevent ammonia from being discharged to downstream of the second selective reduction catalyst, even in a case of a large amount of ammonia being released from the first selective reduction catalyst again, by way of storing this ammonia in the second selective reduction catalyst, as shown in FIG. 27.

Next, urea injection control processing executed by an ECU will be explained while referring to FIG. 29.

Figure 29:
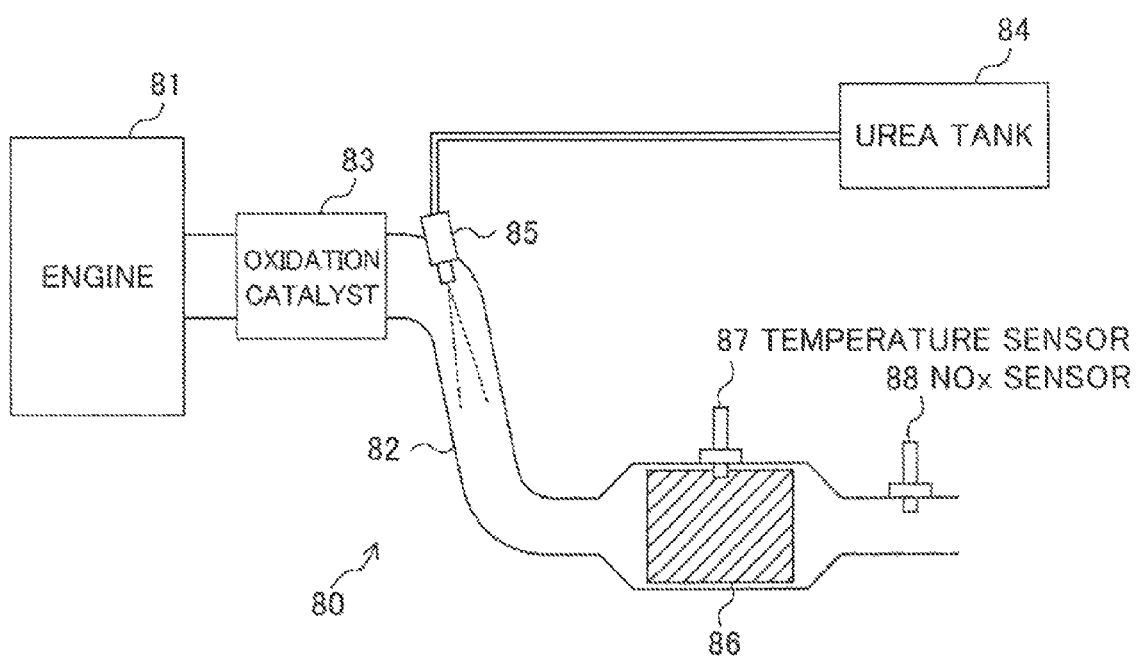
FIG. 29 is a schematic diagram showing a configuration of a conventional exhaust purification apparatus.
Figure 30:
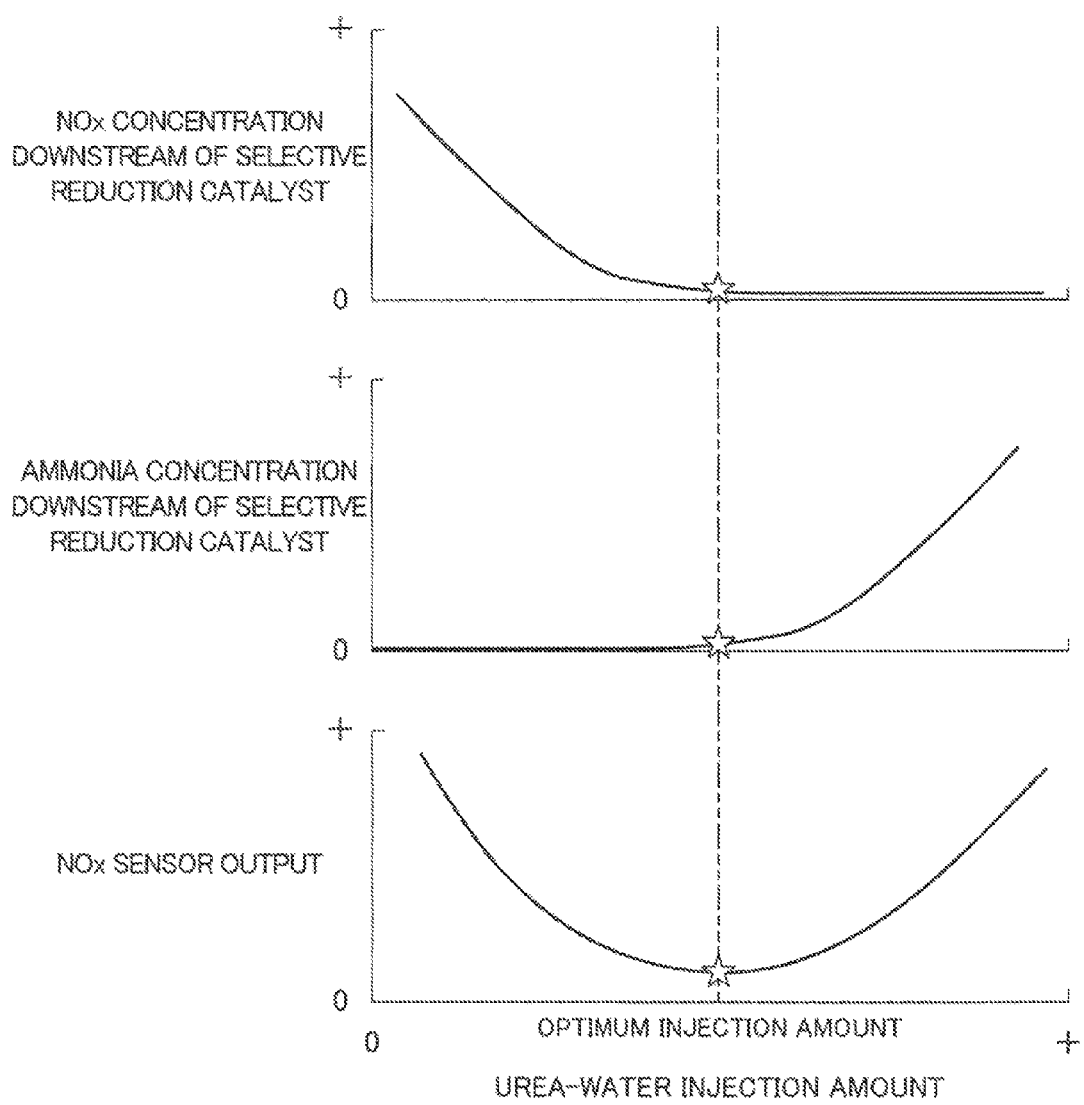
FIG. 30 shows, relationships between a NOx emission amount and ammonia emission amount downstream of the selective reduction catalyst and the output of the NOx sensor for the conventional exhaust purification apparatus.

FIG. 29 is a flowchart showing a sequence of urea injection control processing executed by the ECU.

This urea injection control processing is processing to calculate the urea injection amount $G_{UREA}$ by way of the aforementioned technique, and is executed every predetermined control cycle.

In Step S1, it is determined whether a urea fault flag $F_{UREANG}$ is "1". This urea fault flag $F_{UREANG}$ is set to "1" when it is determined that the urea injection device has failed in determination processing, which is not illustrated, and is otherwise set to "0". In a case of this determination being YES, Step S9 is advanced to, and after the urea injection amount $G_{UREA}$ has been set to "0", this processing ends. In a case of this determination being NO, Step S2 is advanced to.

In Step S2, it is determined whether a catalyst degradation flag $F_{SCRNG}$ is "1". This catalyst degradation flag $F_{SCRNG}$ is set to "1" when it has been determined that either of the first selective reduction catalyst and the second selective reduction catalyst have failed in determination processing, which is not illustrated, and is otherwise set to "0". In a case of this determination being YES, Step S9 is advanced to, and after the urea injection amount $G_{UREA}$ has been set to "0", this processing ends. In a case of this determination being NO, Step S3 is advanced to.

In Step S3, it is determined whether a urea remaining amount $Q_{UREA}$ is less than a predetermined value $Q_{REF}$. This urea remaining amount $Q_{UREA}$ indicates a remaining amount of urea water in the urea tank, and is calculated based on the output of a urea-level sensor. In a case of this determination being YES, Step S4 is advanced to, and in a case of being NO, Step S5 is advanced to.

In Step S4, a urea remaining amount warning lamp illuminates, Step S9 is advanced to, and after the urea injection amount $G_{UREA}$ has been set to "0", this processing ends.

In Step S5, it is determined whether a catalyst warm-up timer value $T_{MAST}$ is larger than a predetermined value $T_{MLMT}$. This catalyst warm-up timer value $T_{MAST}$ measures a warm-up time of the urea selective reduction catalyst after engine startup. In a case of this determination being YES, Step S6 is advanced to. In a case of this determination being NO, Step S9 is advanced to, and after the urea injection amount $G_{UREA}$ has been set to "0", this processing ends.

In Step S6, it is determined whether a sensor fault flag $F_{SENNG}$ is "0". This sensor fault flat $F_{SENNG}$ is set to "1" when it has been determined that the ammonia sensor or the catalyst temperature sensor has failed in determination processing, which is not illustrated, and is otherwise set to "0". In a case of this determination being YES, Step S7 is advanced to. In a case of this determination being NO, Step S9 is advanced to, and after the urea injection amount $G_{UREA}$ has been set to "0", this processing ends.

In Step S7, it is determined whether an ammonia sensor activity flag $F_{NH3ACT}$ is 1. This ammonia sensor activity flag $F_{NH3ACT}$ is set to "1" when it has been determined that the ammonia sensor has reached an active state in determination processing, which is not illustrated, and is otherwise set to "0". In a case of this determination being YES, Step S8 is advanced to. In a case of this determination being NO, Step S9 is advanced to, and after the urea injection amount $G_{UREA}$ has been set to "0", this processing ends.

In Step S8, it is determined whether the temperature $T_{SCR}$ of the first selective reduction catalyst is higher than a predetermined value $T_{SCR\_ACT}$. In a case of this determination being YES, it is determined that the first selective reduction catalyst has been activated, and Step S10 is advanced to. In a case of this determination being NO, it is determined that the first selective reduction catalyst has not yet been activated and urea injection should be stopped, Step S9 is advanced to, and after the urea injection amount $G_{UREA}$ has been set to "0", this processing ends.

In Step S10, the target ammonia concentration $NH3_{CONS\_TRGT}$ is calculated by the aforementioned target ammonia concentration setting portion based on formulas (24) to (29), and Step S11 is advanced to.

In Step S11, the FF injection amount $G_{UREA\_FF}$ is calculated by the aforementioned feed-forward controller, and Step S12 is advanced to.

In Step S12, the corrected injection amount $G_{UREA\_ST}$ is calculated by the aforementioned storage corrected input calculating portion based on formulas (8) to (23), and Step S13 is advanced to.

In Step S13, the FB injection amount $G_{UREA\_FB}$ is calculated by the aforementioned sliding-mode controller based on formulas (2) to (7), and Step S14 is advanced to.

In Step S14, the urea injection amount $G_{UREA}$ is calculated by the aforementioned adder based on formula (1), and this processing ends.

In the present embodiment, the ammonia concentration detection means is configured by the ammonia sensor 26, and the first control input calculation means, second control input calculation means, third control input calculation means, reducing agent supply amount determination means, and target ammonia concentration setting means are configured by the ECU 3. More specifically, the first control input calculation means is configured by the feed-back controller 4 and sliding mode controller 42 of the ECU 3, the second input calculation means is configured by the feed-forward controller 5 of the ECU 3, the third control input calculation means is configured by the storage corrected input calculating portion 6 of the ECU 3, the reducing agent supply amount determination means is configured by the adder 7 of the ECU 3, and the target ammonia concentration setting means is configured by the feed-back controller 4 and the target ammonia concentration setting portion 41 of the ECU 3.

It should be noted that the present invention is not to be limited to the aforementioned embodiment, and various modifications thereto are possible.

The invention claimed is:

1. An exhaust purification apparatus for an internal combustion engine that includes a selective reduction catalyst that is provided in an exhaust channel of an internal combustion engine, generates ammonia under the presence of a reducing agent, and reduces NOx flowing through the exhaust channel by way of this ammonia, wherein the selective reduction catalyst is configured to include a first selective reduction catalyst, and a second selective reduction catalyst that is provided in the exhaust channel further to a downstream side than the first selective reduction catalyst, the apparatus comprising:

a reducing agent supply means for supplying reducing agent into the exhaust channel to an upstream side of the selective reduction catalyst;

an ammonia concentration detection means for detecting an ammonia concentration in the exhaust channel between the first selective reduction catalyst and the second selective reduction catalyst;

a first control input calculation means for calculating a control input for controlling so that a value of the ammonia concentration detected by way of the ammonia concentration detection means becomes a value greater than "0";

a reducing agent supply amount determination means for determining a supply amount of the reducing agent from the reducing agent supply means to include the control input calculated by the first control input calculation means; and a target ammonia concentration setting means for setting a value of a target concentration of the ammonia concentration detected by way of the ammonia concentration detection means to a value larger than "0", wherein the first control input calculation means calculates the control input so that the ammonia concentration detected by the ammonia concentration detection means falls within a predetermined range containing the target concentration.

2. An exhaust purification apparatus for an internal combustion engine according to claim 1, wherein an ammonia amount that can be stored in the first selective reduction catalyst is set as a first storage capacity, an ammonia amount that can be stored in the second selective reduction catalyst is set as a second storage capacity, and the second storage capacity is larger than a difference between a maximum and minimum of the first storage capacity.

3. An exhaust purification apparatus for an internal combustion engine according to claim 1, wherein the first control input calculation means is configured to be able to execute response specific control that can set a convergence rate to the target concentration of the ammonia concentration detected by way of the ammonia concentration detection means, and sets a convergence rate in a case of the ammonia concentration detected by way of the ammonia concentration detection means being contained within the predetermined range to be slower than a convergence rate in a case of the ammonia concentration detected by way of the ammonia concentration detection means being contained outside of the predetermined range.

4. An exhaust purification apparatus for an internal combustion engine according to claim 1, wherein an ammonia amount stored in the second selective reduction catalyst is set as a second storage amount, and wherein the target ammonia concentration setting means estimates the second storage amount and sets the target concentration based on the second storage amount thus estimated.

5. An exhaust purification apparatus for an internal combustion engine according to claim 1, further comprising a second control input calculation means for calculating a control input based on a revolution speed of the internal combustion engine and a load parameter representing a load of the internal combustion engine, wherein the reducing agent supply amount determination means determines a supply amount of reducing agent from the reducing agent supply means to further include the control input calculated by the second control input calculation means.

6. An exhaust purification apparatus for an internal combustion engine according to claim 1, wherein an ammonia amount stored in the first selective reduction catalyst is set as a first storage amount, the apparatus further comprising a third control input calculation means for estimating the first storage amount, and calculating a control input for controlling so that the first storage amount thus estimated converges with a predetermined target storage amount, wherein the reducing agent supply amount determination means determines a supply amount of reducing agent by way of the reducing agent supply means to further include the control input calculated by way of the third control input calculation means.

7. An exhaust purification apparatus for an internal combustion engine according to claim 6, wherein the third control input calculation means calculates a control input based on a deviation between the first storage amount estimated and the target storage amount as well as on a derivative of the deviation or a derivative of the first storage amount.

8. An exhaust purification apparatus for an internal combustion engine according to claim 2, wherein the first control input calculation means is configured to be able to execute response specific control that can set a convergence rate to the target concentration of the ammonia concentration detected by way of the ammonia concentration detection means, and sets a convergence rate in a case of the ammonia concentration detected by way of the ammonia concentration detection means being contained within the predetermined range to be slower than a convergence rate in a case of the ammonia concentration detected by way of the ammonia concentration detection means being contained outside of the predetermined range.

9. An exhaust purification apparatus for an internal combustion engine according to claim 2, wherein an ammonia amount stored in the second selective reduction catalyst is set as a second storage amount, and wherein the target ammonia concentration setting means estimates the second storage amount and sets the target concentration based on the second storage amount thus estimated.

10. An exhaust purification apparatus for an internal combustion engine according to claim 2, further comprising a second control input calculation means for calculating a control input based on a revolution speed of the internal combustion engine and a load parameter representing a load of the internal combustion engine, wherein the reducing agent supply amount determination means determines a supply amount of reducing agent from the reducing agent supply means to further include the control input calculated by the second control input calculation means.

11. An exhaust purification apparatus for an internal combustion engine according to claim 2, wherein an ammonia amount stored in the first selective reduction catalyst is set as a first storage amount, the apparatus further comprising a third control input calculation means for estimating the first storage amount, and calculating a control input for controlling so that the first storage amount thus estimated converges with a predetermined target storage amount, wherein the reducing agent supply amount determination means determines a supply amount of reducing agent by way of the reducing agent supply means to further include the control input calculated by way of the third control input calculation means.

12. An exhaust purification apparatus for an internal combustion engine according to claim 11, wherein the third control input calculation means calculates a control input based on a deviation between the first storage amount estimated and the target storage amount as well as on a derivative of the deviation or a derivative of the first storage amount.

* * * * *